United States Patent
Lee et al.

(10) Patent No.: US 12,376,182 B2
(45) Date of Patent: Jul. 29, 2025

(54) METHOD AND DEVICE FOR CONTROLLING TERMINAL CONNECTION STATE FOR PROVIDING ULTRA-LOW-LATENCY LOCATION INFORMATION SERVICE IN WIRELESS COMMUNICATION SYSTEM

(71) Applicant: Samsung Electronics Co., Ltd., Suwon-si (KR)

(72) Inventors: Jicheol Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 17/913,653

(22) PCT Filed: Mar. 26, 2021

(86) PCT No.: PCT/KR2021/003794
§ 371 (c)(1),
(2) Date: Sep. 22, 2022

(87) PCT Pub. No.: WO2021/194311
PCT Pub. Date: Sep. 30, 2021

(65) Prior Publication Data
US 2023/0116776 A1    Apr. 13, 2023

(30) Foreign Application Priority Data
Mar. 26, 2020   (KR) .................. 10-2020-0036609
Mar. 26, 2021   (KR) .................. 10-2021-0039581

(51) Int. Cl.
*H04W 76/25*   (2018.01)
*G01S 5/00*    (2006.01)
*H04W 64/00*   (2009.01)

(52) U.S. Cl.
CPC ........... *H04W 76/25* (2018.02); *G01S 5/0036* (2013.01); *H04W 64/00* (2013.01)

(58) Field of Classification Search
CPC ............. H04W 12/041; H04W 12/069; H04W 12/122; H04W 64/00; H04W 76/25;
(Continued)

(56) References Cited

U.S. PATENT DOCUMENTS 9,445,388 B2    9/2016  Jung et al.
10,798,540 B2*  10/2020 Ohgishi ................ H04W 76/15
(Continued)

FOREIGN PATENT DOCUMENTS

KR   10-2013-0063913 A    6/2013
KR   10-2015-0022760 A    3/2015
(Continued)

OTHER PUBLICATIONS

Extended European Search Report dated Jul. 26, 2023, issued in European Patent Application No. 21775607.1.
(Continued)

*Primary Examiner* — Joseph Arevalo
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of an access and mobility management function (AMF) of a wireless communication system according to one embodiment of the present disclosure is
(Continued)

characterized by comprising the steps of: determining a connection mode of a terminal for a location information service of the terminal; transmitting, to a base station, a first message including at least one of information requesting activation of the connection mode and information on a time related to the connection mode; and receiving a second message including information on whether the connection mode is activated from the base station in response to the first message, wherein a timer value for maintaining a connection state of the terminal is configured to measure location information of the terminal on the basis of the at least one of the information requesting activation of the connection mode and the information on a time related to the connection mode.

15 Claims, 24 Drawing Sheets

(58) Field of Classification Search
CPC ... H04W 76/27; H04W 76/38; H04W 84/045; H04W 88/12; H04W 88/14; H04W 88/18; H04W 92/02; H04W 92/04
USPC ....... 370/329, 331, 506, 252, 328, 230, 352, 370/465, 347
See application file for complete search history.

(56) References Cited

U.S. PATENT DOCUMENTS

| | | | |
|---|---|---|---|
| 10,917,786 B2 | 2/2021 | Ryoo et al. | |
| 2008/0261596 A1* | 10/2008 | Khetawat | H04W 12/122 455/436 |
| 2009/0054035 A1 | 2/2009 | Kim et al. | |
| 2013/0322418 A1* | 12/2013 | Ho | H04W 48/20 370/338 |
| 2020/0014796 A1* | 1/2020 | Schwartze | H04M 7/0012 |
| 2020/0100171 A1* | 3/2020 | Uchikawa | H04W 84/12 |
| 2021/0051462 A1* | 2/2021 | Choi | H04W 76/15 |
| 2021/0067275 A1* | 3/2021 | Takeda | H04L 1/1861 |
| 2021/0212105 A1* | 7/2021 | Takeda | H04W 72/23 |
| 2022/0022067 A1* | 1/2022 | Kim | H04L 5/0098 |

FOREIGN PATENT DOCUMENTS

| | | |
|---|---|---|
| KR | 10-2017-0126582 A | 11/2017 |
| KR | 10-2018-0018455 A | 2/2018 |
| KR | 10-2018-0103655 A | 9/2018 |
| WO | 2014/052877 A1 | 4/2014 |

OTHER PUBLICATIONS

Intel Corporation (Rapporteur): Email discussion report on [104#35][NR] Positioning SI (Intel), 3GPP Draft; R2-1900753, Feb. 15, 2019, Athens, Greece.

Samsung: On UE behaviour upon going out of service, 3GPP Draft; R2-1811045, Aug. 10, 2018, Gothenburg, Sweden.

TS 22.104 V16.4.0 (Dec. 2019) 3rd Generation Partnership Project; Technical Specification Group Services and System Aspects; Service requirements for cyber-physical control applications in vertical domains; Stage 1 (Release 16), Dec. 20, 2019.

TS 22.261 V16.10.0 (Dec. 2019) third Generation Partnership Project; Technical Specification Group Services and System Aspects; Service requirements for the 5G system; Stage 1 (Release 16), Dec. 27, 2019.

* cited by examiner

METHOD AND DEVICE FOR CONTROLLING TERMINAL CONNECTION STATE FOR PROVIDING ULTRA-LOW-LATENCY LOCATION INFORMATION SERVICE IN WIRELESS COMMUNICATION SYSTEM

TECHNICAL FIELD

The disclosure relates to a wireless communication system, and more particularly, to a method and device for providing a location information service in a cellular wireless communication system (5G System).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A 3rd generation partnership project (3GPP), which is in charge of cellular mobile communication standards, has named a new core network structure to a 5G core (5GC) and is in a process of standardization in order to evolve from the existing 4G LTE system to the 5G system.

DISCLOSURE OF INVENTION

Technical Problem

The disclosure relates to a method of controlling a terminal for providing a low latency location information service. A high-precision ultra-low latency location information service required by a 5G service requires a service response time of around 10-15 ms. In case that a terminal moves to an idle state (CM-IDLE or RRC IDLE) state, the terminal cannot provide a service during a period of an idle mode discontinuous reception (DRX) cycle thereof; thus, the terminal cannot satisfy requirements of the high-precision low-latency location information service. The disclosure provides a method of controlling a terminal for providing a location information service with requirements of a low-delay service response time, when the terminal receives a request for a high-precision low-delay location information service, by controlling a state of the terminal.

Solution to Problem

According to an embodiment of the disclosure, a method of operating an access and mobility management function (AMF) of a wireless communication system includes determining a connection mode of a terminal for a location information service of the terminal; transmitting, to a base station, a first message including at least one of information requesting activation of the connection mode or information on a time related to the connection mode; and receiving, from the base station, a second message including information on whether to activate the connection mode in response to the first message, wherein a timer value for maintaining a connected state of the terminal is configured to measure location information of the terminal based on at least one of information requesting activation of the connection mode or information on a time related to the connection mode.

Further, according to an embodiment of the disclosure, a method of operating a base station of a wireless communication system includes receiving, from an access and mobility management function (AMF), a first message including at least one of information requesting activation of a connection mode of a terminal for a location information service of the terminal or information on a time related to the connection mode; configuring a timer value for maintaining a connected state of the terminal in order to measure location information of the terminal based on at least one of information requesting activation of the connection mode or information on a time related to the connection mode; and transmitting, to the AMF, a second message including information on whether to activate the connection mode in response to the first message.

Further, according to an embodiment of the disclosure, an access and mobility management function (AMF) of a wireless communication system includes a transceiver; and a controller configured to determine a connection mode of a terminal for a location information service of the terminal, to control the transceiver to transmit a first message including at least one of information requesting activation of the connection mode or information on a time related to the connection mode to the base station, and to control the transceiver to receive a second message including information on whether the connection mode has been activated from the base station in response to the first message, wherein a timer value for maintaining a connected state of the terminal is configured to measure location information of the terminal based on at least one of information requesting activation of the connection mode or information on a time related to the connection mode.

Further, according to an embodiment of the disclosure, a base station of a wireless communication system includes a transceiver; and a controller configured to control the transceiver to receive, from an access and mobility management function (AMF), a first message including at least one of information requesting activation of a connection mode of a terminal for a location information service of the terminal or information on a time related to the connection mode, to configure a timer value for maintaining a connected state of the terminal in order to measure location information of the terminal based on at least one of information requesting activation of the connection mode or information on a time related to the connection mode, and to control the transceiver to transmit, to the AMF, a second message including information on whether the connection mode has been activated in response to the first message.

Advantageous Effects of Invention

According to the disclosure, in order to satisfy requirements of a location information service, by continuing to maintain a terminal in an RRC connected state during a period in which an ultra-low latency location service is required, a location service of the terminal can be provided within a response time.

MODE FOR THE INVENTION

Figure 1:
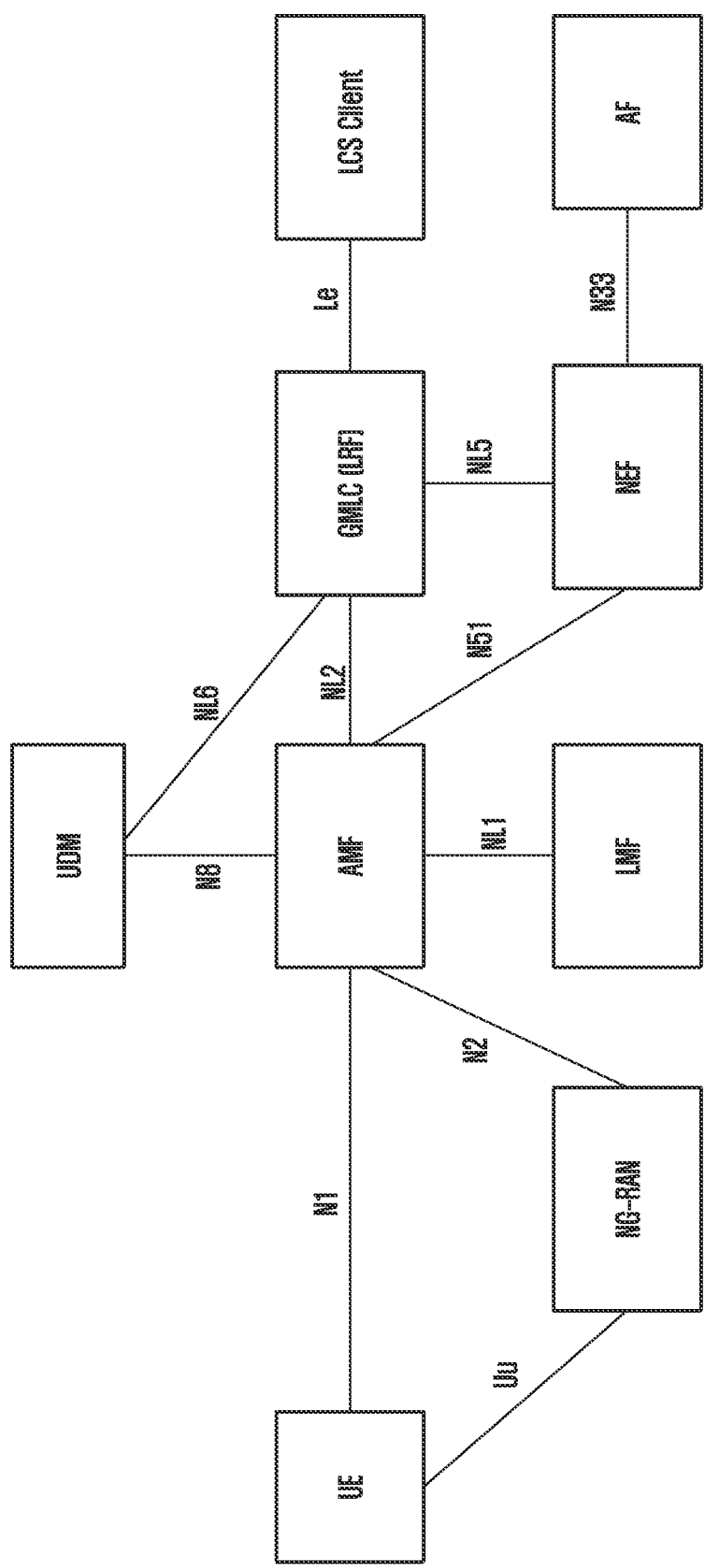
FIG. 1 is a conceptual diagram illustrating a network structure (including LMF) and an interface for providing a core network location information service in a 5G system according to an embodiment of the disclosure.

In describing embodiments in this specification, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only these embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of message flow diagrams and combinations of the message flow diagrams may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the message flow diagram block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term '-unit' used in this embodiment means software or hardware components such as FPGA or ASIC, and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card.

Hereinafter, embodiments of the disclosure will be described in detail with reference to the accompanying drawings. Further, in the description of the disclosure, when it is determined that a detailed description of a related known function or configuration may unnecessarily obscure the subject matter of the disclosure, a detailed description thereof will be omitted. Terms described below are terms defined in consideration of functions in the disclosure, which may vary according to intentions or customs of users and operators. Therefore, the definition should be made based on the content throughout this specification. Hereinafter, a base station is a subject performing resource allocation of the terminal and may be an eNode B, Node B, base station (BS), radio access network (RAN), access network (AN), RAN node, radio access unit, base station controller, or at least one of nodes on a network. The terminal may include a user equipment (UE), a mobile station (MS), a cellular phone, a smart phone, a computer, or a multimedia system capable of performing a communication function. In the disclosure, a downlink (DL) is a wireless transmission path of a signal transmitted from a base station to a terminal, and an uplink (UL) is a wireless transmission path of a signal transmitted from a terminal to a base station. Hereinafter, although LTE or LTE-A system may be described as an example, embodiments of the disclosure may be applied to other communication systems having a similar technical background or channel type. Further, an embodiment of the disclosure may be applied to other communication systems through some modifications within a range that does not significantly deviate from the scope of the disclosure by the determination of a person having skilled technical knowledge.

A 5G core (5GC) may support the following differentiated functions compared to an evolved packet core (EPC), which is a network core for existing 4G.

First, in 5GC, a network slice function may be introduced. As requirements of 5G, 5GC may need to support various kinds of terminal types and services. For example, the 5GC may need to support enhanced mobile broadband (eMBB), ultra reliable low latency communications (URLLC), and massive machine type communications (mMTC) services. The terminal and the service may each have different requirements for a core network. For example, an eMBB service may require a high data rate and a URLLC service may require high reliability and low latency. In order to satisfy these various service requirements, a network slice technology may be proposed.

A network slice is a method of virtualizing one physical network to create multiple logical networks, and each network slice instance (NSI) may have different characteristics. Therefore, each NSI may have a network function (NF)) corresponding to characteristics thereof, thereby satisfying various service requirements. Each terminal may assign an NSI corresponding to characteristics of a required service to efficiently support multiple 5G services.

Second, the 5GC may facilitate the support of the network virtualization paradigm through separation of a mobility management function and a session management function. In the existing 4G LTE, all terminals could receive a service on a network through signaling exchange with single-core equipment called mobility management entity (MME), which is responsible for registration, authentication, mobility management, and session management functions. However, in 5G, as the number of terminals explodes and the mobility and traffic/session characteristics that need to be supported are subdivided according to the type of terminal, when all functions are supported by a single equipment such as an MME, the scalability of adding entities for each required function is inevitably low. Therefore, in order to improve scalability in terms of the function/implementation complexity of a core equipment responsible for a control plane and a signaling load, various functions may be developed based on a structure that separates the mobility management function and the session management function.

FIG. 1 is a conceptual diagram illustrating network architecture and an interface supporting a location service for a 5G system according to an embodiment of the disclosure.

With reference to FIG. 1, a network structure of the 5G system may include a user equipment (UE), radio access network ((R)AN), user plane function (UPF), data network (DN), authentication server function (AUSF), access and mobility management function (AMF), session management function (SMF), network slice selection function (NSSF), network exposure function (NEF), network repository function (NRF), policy control function (PCF), unified data management (UDM), or application function (AF).

According to an embodiment of the disclosure, the UE may mean a UE. The AMF is a network function that manages the mobility of the UE. The SMF is a network function for managing a packet data network connection provided to the UE. A connection structure as illustrated in FIG. 1 is referred to as a protocol data unit (PDU) session.

The PCF is a network function that applies a service policy and a billing policy of a mobile communication provider, and a policy for a PDU session to the UE. The UDM is a network function that stores and manages information on subscribers. The NEF may access information that manages the UE in the 5G network so that it may be connected to a network function (NF) of a 5G core network to transmit information on the UE to the corresponding NFs or to report information on the UE to the outside, such as subscription to a mobility management event of the UE, subscription to a session management event of the UE, request for session related information, charging information configuration of the UE, and PDU session policy change request on the UE. A 5G-RAN means a base station that provides a wireless communication function to the UE. In FIG. 1, the 5G-RAN was illustrated as (R)AN. The UPF may serve as a gateway for transmitting packets transmitted and received by the UE. The UPF may be connected to a data network (DN) to perform a function of transmitting data packets generated in the 5G system to an external data network. For example, the UPF may be connected to a data network connected to the Internet, and route a data packet sent by the UE to the Internet.

The 5G system may provide a high-precision low-latency location information service.

With reference to FIG. 1, a location management function (LMF) may be a network function responsible for the overall management of necessary resources in order to provide location information of a UE registered in 5G. The LMF may perform an operation of calculating location information of the UE, or finally identifying a location of the UE and reporting the location to the global mobile location center (GMLC).

The LMF may receive a location information request for a target UE from the AMF through an Nlmf interface. The LMF exchanges location information necessary for a UE-based positioning method or a UE assisted positioning method, and such a protocol may be referred to as an LTE positioning protocol (LPP). An LPP protocol may be a protocol used for a UE-based positioning method or a UE-assisted positioning method between a UE and a location information positioning server (LMF or LMC in the disclosure). The LPP protocol is not necessarily a protocol limited to LTE, and may also be used in NR. The LMF determines the positioning result on geographical co-ordinates. The positioning result determined by the LMF may include a speed of the UE. Further, the LMF may perform the following functions.

The LMF may provide a location information service to a UE location information request for a target UE from a serving AMF.

The LMF may provide a location information service for a request triggered according to a UE location or periodically for a target UE from a serving AMF.

The LMF may determine a positioning method according to whether a capability of the UE and an operator network, a service quality, and an LCS client type.

The LMF may report UE positioning information triggered according to the UE position or periodically for the target UE to the GMLC.

The LMF may cancel a UE positioning information report triggered according to the UE position or periodically for the target UE.

The LMF may provide assistance data for providing location information broadcast to the UE through the NG-RAN.

With reference to FIG. 1, the gateway mobile location center (GMLC) may provide necessary functions in order to provide a location service. In one operator, there may be more than one GMLC. One GMLC may be a first node in which an external LCS client accesses the operator network. The NF in the 5G core network that accesses the AF and the GMLC may either directly access the GMLC or access through the NEF. The GMLC may request routing information and personal information of the target UE from the UDM through a Nudm interface. After identifying the authority of the external LCS client and the AF and verifying personal information of the target UE, the GMLC may forward a location information request to a serving AMF through the Namf interface. In case that the UE is in a roaming service state, the GMLC may forward a location information request to a PLMN of another operator network.

The identification of a personal information configuration of the UE may be as follows.

Before transmitting the result of location positioning of the target UE, a personal information configuration of the UE should be identified, and the identification of the personal information configuration may always be made in a home business network of the UE. A visited GMLC (VGMLC) may be a GMLC existing in a serving operator network of the target UE.

A home HGMLC is a GMLC existing in a home operator of the target UE, and may perform a role for identifying personal information of the target UE.

Figure 2:
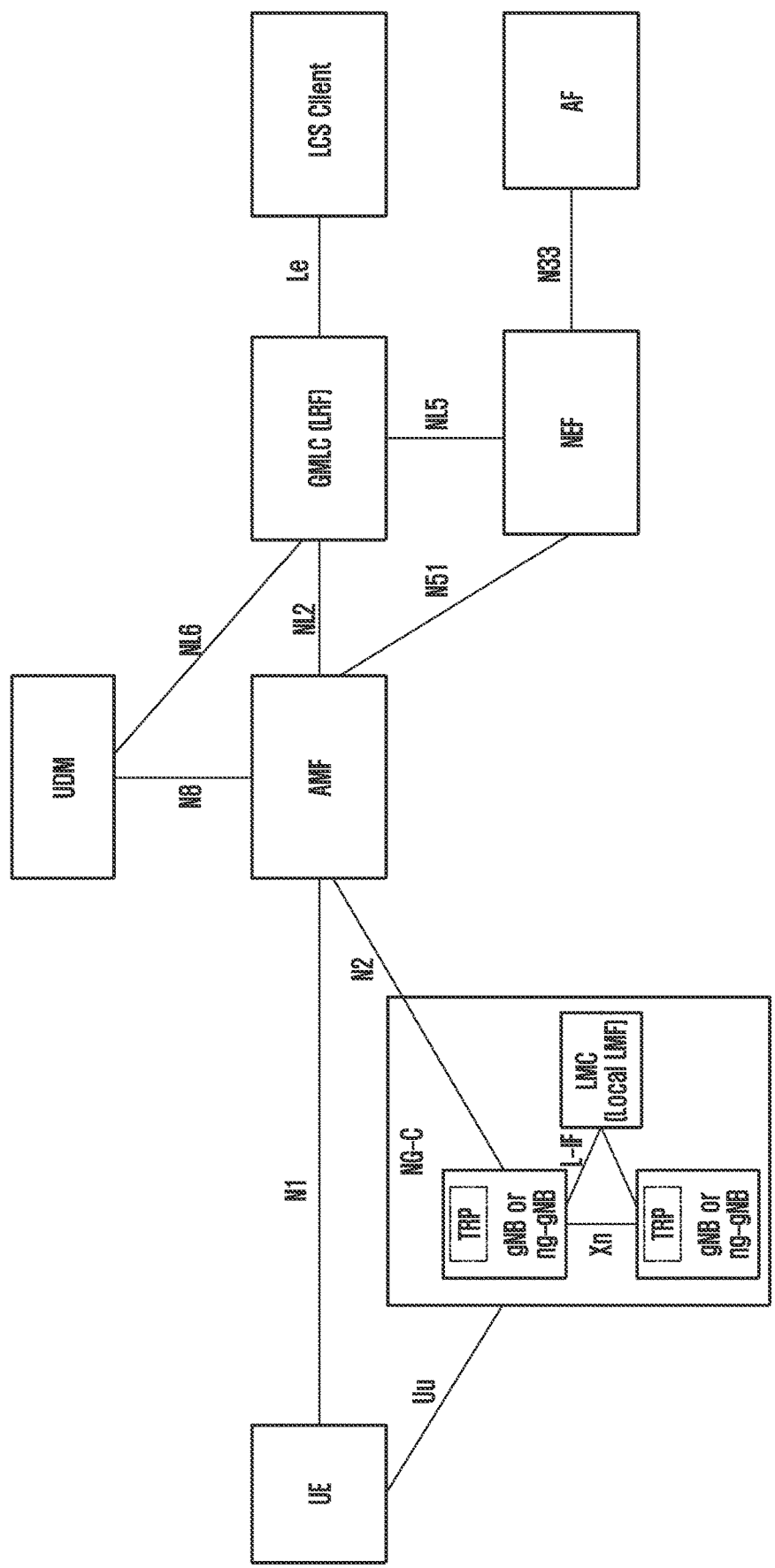
FIG. 2 is a conceptual diagram illustrating a network structure (including an LMC) and an interface for providing a RAN-based location information service in a 5G system according to an embodiment of the disclosure.

FIG. 2 is a conceptual diagram illustrating an RAN-based location information service provision structure according to an embodiment of the disclosure.

A network constitution of FIG. 2 may be different from the network constitution of FIG. 1 for providing a location information service in the 5G system. For example, in FIG. 1, the LMF performing a function of measuring location information has a constitution connected to the 5G core network through the AMF and the interface, whereas in FIG. 2, a location management component (LMC) performs a function of measuring location information of the UE, and may be positioned in the RAN. The LMC of FIG. 2 may perform a function provided by the LMF described in FIG. 1. However, the LMC exists in an NG-RAN, and may be connected to the gNB or the ng-gNB through an L-IF. In FIG. 2, the UE, GMLC, UDM, LCS client, AF, and NEF may perform the same functions as those described in FIG. 1. However, in case that the GMLC receives a location information request, the GMLC may transmit the location information request to the AMF, and the AMF may transmit the location information request to the NG-RAN through an N2 reference point. The gNB (or ng-gNB) may transmit the received location information request to the LMC through the L-IF.

The LMC may be a network function in charge of overall management of resources required to provide location information of the UE. The LMC may be responsible for calculating location information of the UE or finally identifying the UE location and reporting it to the global mobile location center (GMLC).

The LMC may receive a location information request for the target UE transmitted from the AMF to the NG-RAN through an N2 reference point. In case that the LMC exists as a separate NF in the NG-RAN, as illustrated in FIG. 2, the LMC may be connected to the gNB through the L-IF interface. The gNB may transmit the location information request received from the AMF to the LMC through the N2 reference. The LMC may receive the location information request forwarded from the AMF through the gNB. The LMC may perform a function within the gNB or the ng-gNB and in this case, the L-IF may exist within the gNB or the ng-gNB and thus may not be exposed to the outside.

The LMC may exchange location information necessary for a UE-based positioning method or a UE assisted positioning method, and such a protocol may be referred to as an LTE positioning protocol (LPP). A protocol referred to as an location information request message, a location information service identifier, a location information response time, and required precision of the location information.

A 5G service may have requirements for high-precision low-latency positioning, as illustrated in the following table. Table 1 illustrates the high-precision low-latency positioning requirements.

TABLE 1

| Positioning service level | Absolute(A) or Relative(R) positioning | Horizontal Accuracy | Vertical Accuracy (note 1) | Positioning service availability | Positioning service latency |
|---|---|---|---|---|---|
| | | Accuracy (95% confidence level) | | | |
| 1 | A | 10 m | 3 m | 95% | 1 s |
| 2 | A | 3 m | 3 m | 99% | 1 s |
| 3 | A | 1 m | 2 m | 99% | 1 s |
| 4 | A | 1 m | 2 m | 99.9% | 15 ms |
| 5 | A | 0.3 m | 2 m | 99% | 1 s |
| 6 | A | 0.3 m | 2 m | 99.9% | 10 ms |
| 7 | R | 0.2 m | 0.2 m | 99% | 1 s |

LPP in the disclosure may be a protocol used for a UE-based positioning method or a UE-assisted positioning method between the UE and the location information positioning server (LMF or LMC in the disclosure). The LPP protocol is not necessarily limited to LTE and may be used in NR. The LMF may determine a positioning result on a geographical co-ordinate. The positioning result determined in the LMC may include a speed of the UE. Further, the LMC may perform the following functions.

The LMC may receive a location information service for a UE location information request for a target UE from a serving AMF. Such a location information request may be received through the gNB and the L-IF.

The LMC may receive a location information request for a request triggered according to the UE location or periodically for the target UE from the serving AMF. Such a location information request may be received through the gNB and the L-IF.

The LMC may determine a positioning method according to whether a capability of the UE and the operator network, a service quality, and an LCS client type.

The LMC may report UE positioning information triggered according to the UE location or periodically for the target UE to the GMLC.

The LMC may cancel UE positioning information triggered according to the UE location or periodically for the target UE.

The LMC may provide assistance data for providing location information broadcast to the UE through the NG-RAN.

Figure 3:
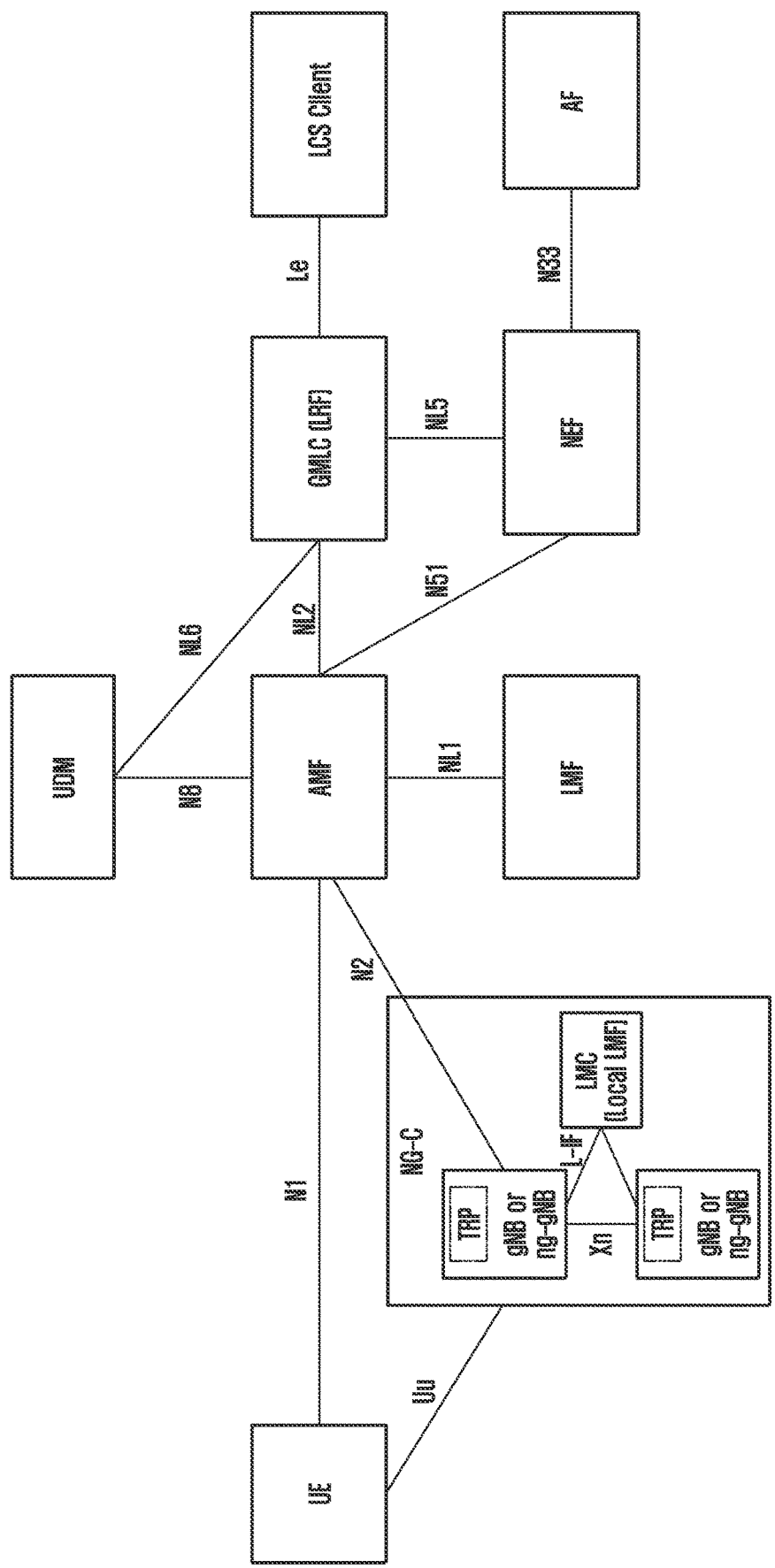
FIG. 3 is a conceptual diagram illustrating a 5G system in which an LMC and an LMF coexist according to an embodiment of the disclosure.

FIG. 3 is a conceptual diagram illustrating a structure in which both an LMC and an LMF exist in one serving operator according to an embodiment of the disclosure.

Descriptions of individual network functions may be the same as or similar to those of functions described with reference to FIGS. 1 and 2. In this structure, the AMF may know whether the LMC and the LMF coexist, and when the AMF receives a location information request, the AMF may determine whether to use an LMC location information service or an LMF location information service in consideration of whether a protocol and function are provided by the UE, a precision level and positioning method provided by the LMC and LMF, a location information request service quality, a service type, and a service identifier included in the With reference to Table 1, positioning service levels 1, 2, 3, 5, and 7 may require a low latency response time with positioning service latency of 1 second. The problem with the current technology is that the UE does not satisfy the service response time of about 1 second in an idle state. In case that the UE is in an idle state, the UE may not satisfy the required service response time according to a DRX cycle.

Figure 4:
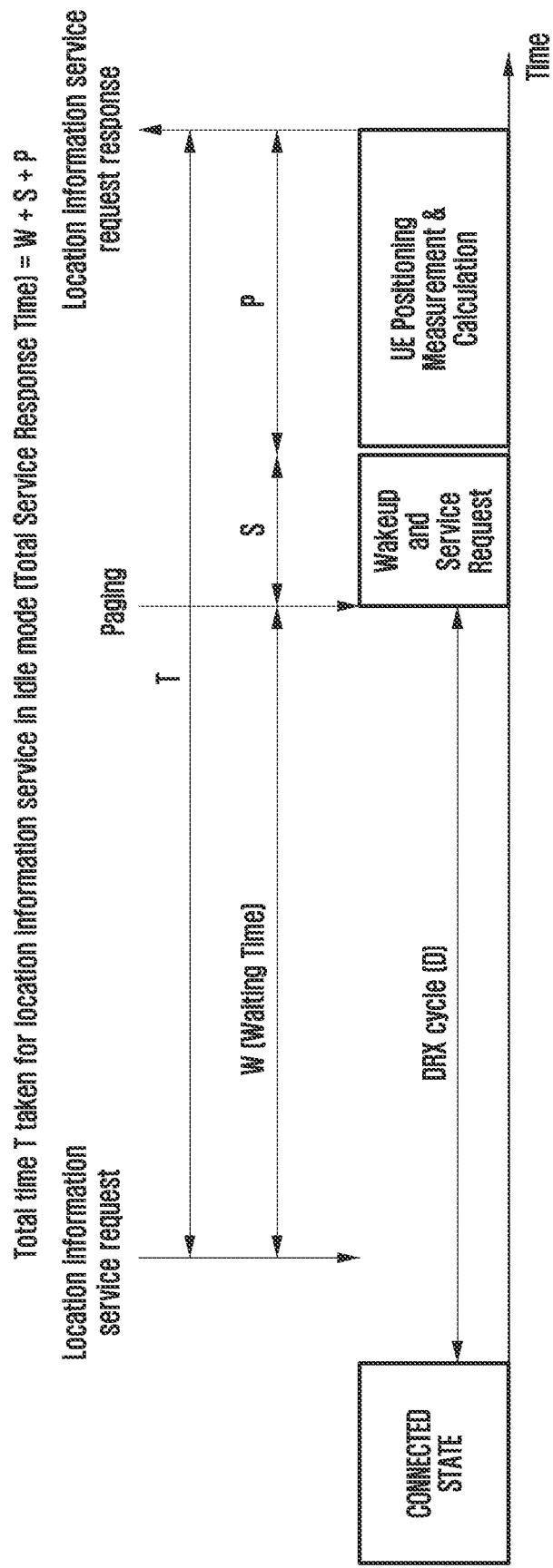
FIG. 4 is a conceptual diagram illustrating a time taken for receiving a location information service request and responding to the location information service request in case that a terminal is in an idle state according to an embodiment of the disclosure.

FIG. 4 is a conceptual diagram illustrating a time taken for receiving a service location information service request and responding to a request for a location information service in case that a UE is in an idle state according to an embodiment of the disclosure. With reference to FIG. 4, in an idle state of the UE, the total time taken for the total location information service may be calculated as follows.

$$T = W + S + P \qquad \text{Equation 1}$$

In Equation 1, T is a time taken for the total location information service in case that the UE is in an idle state. W is a time the UE waits before a service request while staying in an idle state. S is a time taken for the UE to wake up after receiving a paging message and to perform a service request procedure. P is a time taken for a UE positioning procedure, that is, a time to calculate UE positioning related measurement and predicted position.

In case that the UE is in a CONNECTED state, a time taken for the total location information service may be the same as that taken for performing the UE positioning procedure, as illustrated in Equation 2.

$$T = P \qquad \text{Equation 2}$$

For example, when the UE is in a connected state and the time P required to perform the UE positioning procedure is 0.3 seconds, T=0.3; thus, the location information service may be provided within 1 second, which is a required service response time.

However, it is assumed that the UE is in an idle state, the time taken for the UE positioning procedure is P, and the time required for the service request procedure is S. When a time that the UE waits in the idle state is W and a configured DRX cycle value is D, W is greater than 0 and less than D. The total time T required for the location information service may be calculated, as in Equation 3.

$$T = W + S + P \text{ where } 0 < W < D \qquad \text{Equation 3}$$

As a suitable example, if S=0.1 and P=0.3, the total required time may be calculated, as in Equation 4.

$$0.4 < T < 1.6 \qquad \text{Equation 4}$$

When it is assumed that a required service response time is 1 second and an arrival time of the location information service request is uniform, the probability that the location information service request meets the required response time may be expressed, as in Equation 5.

$$P(0.4 < T < 1.0) = 0.5 \qquad \text{Equation 5}$$

In other words, in case that the UE is in an idle mode and in case that there are 100 location information services that require a service response time of 1 second, a response time to 50 requests takes more than 1 second, so that the service requirement cannot be satisfied.

Figure 5:
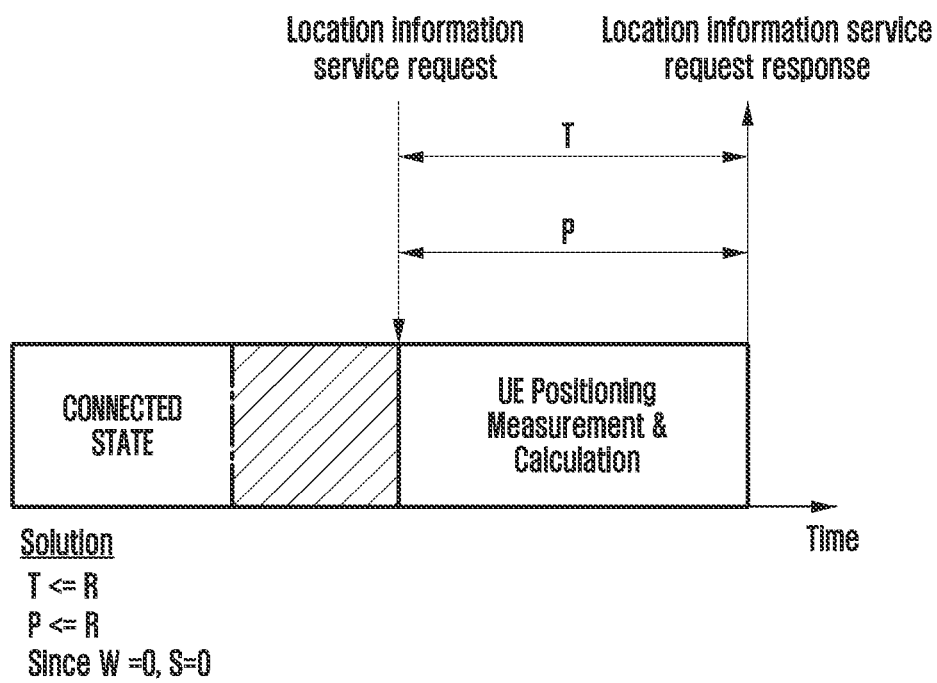
FIG. 5 is a conceptual diagram illustrating an operation for maintaining a terminal in a continuous connected (RRC connected) state according to an embodiment of the disclosure.

FIG. 5 is a conceptual diagram illustrating an operation for maintaining a UE in a continuous connected (RRC connected) state according to an embodiment of the disclosure.

With reference to FIG. 5, a time taken for the UE to wait for paging by a DRX cycle (W in Equation 3) and a time taken for the UE to move from an idle state to a connected state (S in Equation 3) may both be 0. Accordingly, the total time T taken for location information may be expressed as in Equation 6.

$$T = P \qquad \text{Equation 6}$$

In order for the UE to satisfy the location provision service response request time in the connected state, the time taken to perform the location positioning service may be smaller than the required service response request time.

Embodiment 1

Figure 6:
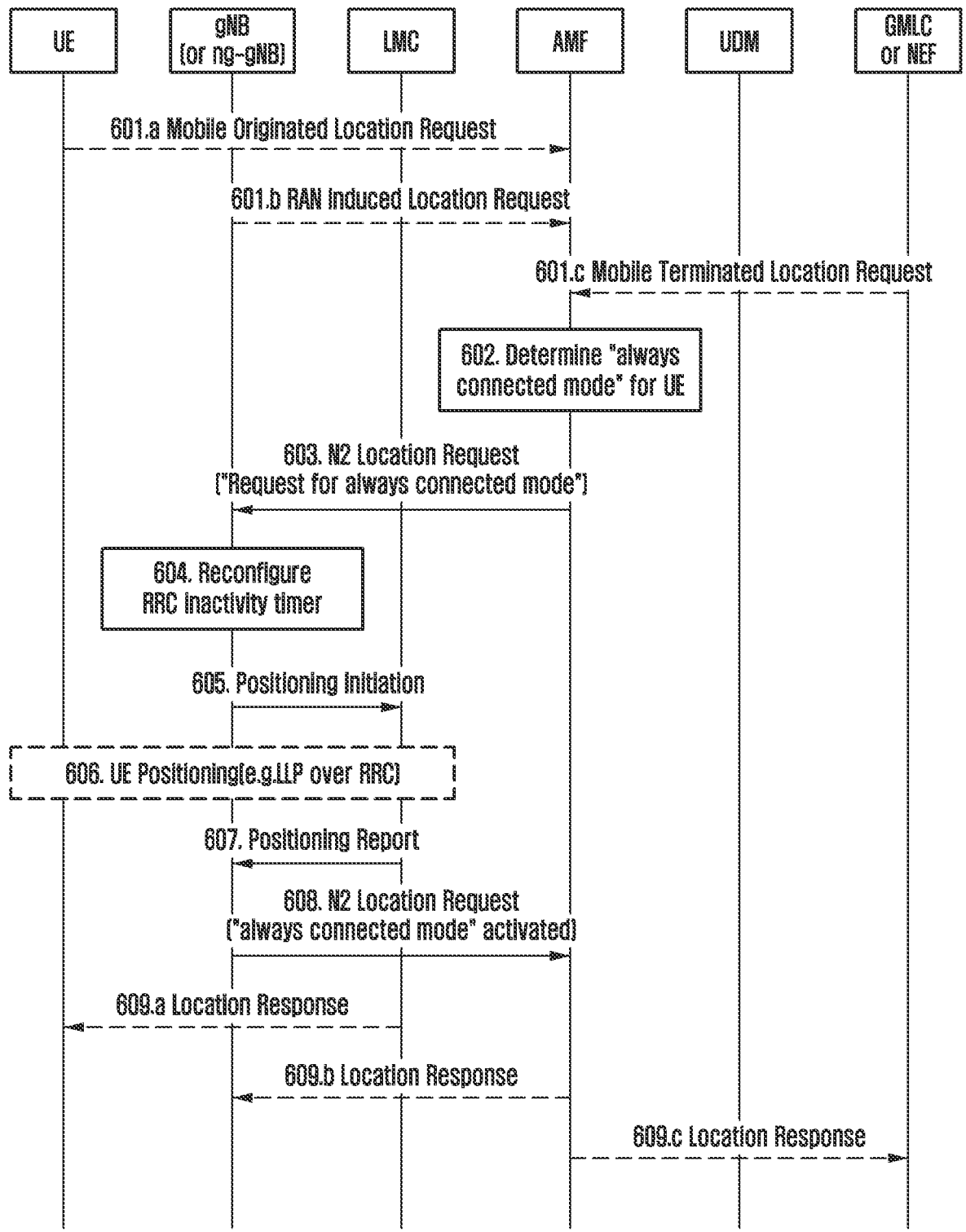
FIG. 6 is a message flow diagram illustrating a method of determining to configure a target terminal to an always connected mode state and transmitting a terminal connected state maintenance request to a RAN when an AMF receives a location information service request including requirements for a service response time or information that can infer requirements for a service response time according to an embodiment of the disclosure.

FIG. 6 is a message flow diagram illustrating a method of determining to configure a target UE to an "always connected mode" (or "always signaling connected mode", hereinafter, may be used interchangeably) state and transmitting a UE connection state maintenance request to an RAN when an AMF receives a location information service request including requirements for a service response time or information that may infer requirements for a service response time according to an embodiment of the disclosure.

With reference to FIG. 6, in step 601, a process in which a location information service client transmits a location information service request is described. The location information service may initiate a request by a UE, a base station, or an external LCS client.

Step 601a: In case that the UE initiates a location information service, the UE may transmit a location information request to the AMF through a NAS message.

Step 601b: The base station may transmit the location information request to the AMF through the N2 message.

Step 601c: An LCS client outside the system may transmit the location information request through the GMLC or NEF. When the GMLC receives the location information service request, the GMLC may transmit an UECM acquisition request to the UDM. The GMLC may receive an AMF identifier or address that manages a target UE of a location request from the UDM. The GMLC may transmit a location information request to the AMF.

The AMF may receive a location information request message from the UE, the base station, or the GMLC. In addition to descriptions described in step 601a/601b/601c with reference to the drawing, the AMF may receive a location information request message from the NEF. Further, the AMF may receive a location information subscription request from UDM. The location provision request message received by the AMF or the subscription request message for the location providing service report may include the following information.

Location QoS information: It may be information indicating a quality of a service for the location information request. Location QoS information may include accuracy of a location and service response time information. Further, location QoS information may include a type of a location information service or a delimiter of the location information service. The location QoS information may be a location service quality index corresponding to precision of location information and a service response time. The location service quality index may be pre-stored in the AMF. Alternatively, the location service quality index may be received from an NF, e.g., UDM or PCF, outside the AMF.

Location information service information: A location information service type and a delimiter of the location information service may be pre-configured in the AMF. The location information service type and the delimiter of the location information service may be received from a device stored in the UDM or PCF, which is an NF outside the AMF. The AMF may extract location information service quality information mapped to the location information service type and the location information service delimiter configured therein. The location information service type may be used for determining a positioning method used for determining a position of the UE in the AMF or LMC.

In step 602, the AMF may receive the location information request in step 601. The AMF may determine to change an always connected mode (hereinafter, ACM) based on the contents included in the service request included in step 601.

In case that the required service response time included in the location information service request is less than or equal to a specific value, the AMF may determine to change the state of the target UE to the ACM state.

In case that the location information service identifier or service type included in the location information service request requires an ultra-low latency service response, the AMF may determine to change the state of the target UE to the ACM state.

In case that service quality information included in the location information service request is assured, in order to perform UE positioning within the required service response time, the AMF may determine to change the state of the target UE to the ACM state.

The AMF may determine to change the state of the target UE to the ACM state based on a location information service quality classification index included in the location information service request and information pre-connected with the location information service quality classification index. Table 2 represents the location information service quality index.

TABLE 2

| Location Information Service Quality Index | Absolute Location (A) Relative Position (R) | Precision | | Service Response Time | Indoor/Outdoor |
| --- | --- | --- | --- | --- | --- |
| | | Horizontal Direction | Vertical Direction | | |
| 1 | A | 10 m | 3 m | 1 s | Indoor/Outdoor |
| 2 | A | 3 m | 3 m | 1 s | Indoor/Outdoor |
| 3 | A | 1 m | 2 m | 1 s | Indoor/Outdoor |
| 4 | A | 1 m | 2 m | 15 ms | Indoor/Outdoor |
| 5 | A | 0.3 m | 2 m | 1 s | Indoor/Outdoor |
| 6 | A | 0.3 m | 2 m | 10 ms | Outdoor |
| 7 | R | 0.2 m | 0.2 m | 1 s | Indoor/Outdoor |

Further, the AMF may determine whether to configure the ACM mode in consideration of a QoS class included in the location information service request. For example, there may be cases where the QoS class is assured and best effort, the QoS class is an assured class that should satisfy a service quality requested by the required location information service request, and in case that the location information service quality index is 4 or 6, the AMF may configure an ACM mode. Further, in case that the location information service request occurs continuously during a specific period rather than one-time occurrence, the AMF may receive information on a continuously occurrence possible period together with the location information service request and enable the RRC state of the UE to become a connected state during the period. That is, by performing step 603 so that the UE may stay in the CONNECTED mode during the requested time, the AMF may initiate a procedure for activating the ACM mode of the UE.

When the AMF determines to activate the ACM mode of the UE, the ACM may store information on whether to activate the ACM mode in the UE context.

In step 603, the AMF may include an indicator that requests to configure to an ACM mode in the N2 location request message (or N2 location control request message) and transmit the N2 location request message (or N2 location control request message) to the RAN (or NG-RAN, or base station, hereinafter, may be used interchangeably). The message may include a time at which the UE should stay in the CONNECTED mode. The time at which the UE should stay in the connection mode may be included in a parameter for configuring the RRC inactivity timer and be transmitted.

The AMF may transmit, to the RAN, an indicator for configuring the ACM mode, a time at which the UE should stay in the connected mode, or an RRC inactivity timer configuration value as a message separate from the N2 location request message.

In step 604, upon receiving the ACM mode activation request indicator, when the RAN node that has received the N2 location request may reconfigure a value of the RRC inactivity timer in which the UE configures to enter the current RRC idle state. In case that the RAN node receives only an ACM mode activation request indicator without information on a period from the AMF, the RAN node may configure the RRC inactivity value (or a value of the RRC inactivity timer, hereinafter, may be used interchangeably) to a sufficiently large value, for example, 30 minutes or 1 hour. When the RAN node receives information on a time in which the UE should stay in the connected state together with the ACM mode activation request indicator from the AMF, the RAN node may determine the RRC inactivity timer value with reference to the received value, and configure the RRC inactivity value for the target UE.

When the RAN node receives time information (e.g., connection retain timer) in which the UE should remain in the connected state, together with the ACM mode activation request indicator from the AMF, the RAN node may configure a connection retain timer value, which is a configuration value for the UE. The connection retain timer is the time at which the UE maintains an ACM mode state, and may be a configuration value separate from the RRC inactivity timer.

In case that the connection retain timer value is less than the RRC inactivity timer value, the connection retain timer value may not be used. After the RRC inactivity timer expires, in case that no traffic is detected, and in case that the ACM mode is not activated, the RAN node may change the state of the UE to the RRC idle state. In case that no traffic is detected during the RRC inactivity timer time, when the ACM mode is activated, the RAN node remains the UE in the RRC connected state. In this case, in order to reduce power consumption of the UE, the RAN node may perform an RRC reconfiguration procedure for adjusting the connection mode DRX cycle for the UE. If no traffic is detected during a connection retain timer value, the RAN node may perform an RRC release procedure to change a state of the UE to the RRC idle state.

An NG-RAN node that has received the N2 location control request may determine the following based on information included in the location control request.
  Whether the NG-RAN node (gNB or ng-gNB) transmits the location information request to the LMC
  In case that there are a plurality of LMCs, an LMC to perform the location information request of the target UE may be selected among the LMCs.
  An LMC that supports a positioning method included in an N2 location control request may be selected among the LMCs.

Alternatively, according to another embodiment, the RAN node that has received the ACM mode activation request indicator may determine to reserve termination of a radio resource for positioning regardless of whether the RRC mode of the UE is changed or the maintenance of the RRC connection mode. In this case, the RAN node may configure a timer value to reserve termination of the radio resource for positioning based on time information (e.g., information on a time in which the UE should stay in the connection mode, or information on an absolute time that performs UE positioning or a relative time from the current) received from the AMF.

Alternatively, according to another embodiment, in case that the RAN node supports an RRC inactive state, the RAN node that has received the ACM mode activation request indicator from the AMF may change a state of the UE to an RRC inactive state while maintaining the UE in a CM-connected state. The UE may perform signal measurement for positioning of the UE in the RRC inactive state.

In step 605, in case that there is an LMC capable of performing the requested N2 position control request, the NG-RAN may initiate a positioning request procedure to the LMC. For example, the base station may transmit a positioning request initiation message (or a positioning request message or positioning initiation message, hereinafter, may be used interchangeably) to the LMC. The positioning request initiation message may transmit the contents included in the N2 position control request message received from the AMF. The contents included in the control request message are described in a procedure 4. For example, the control request message may include the following information:

Location service quality related information: information that maps location information precision and location information service response time information to precision, service response time, or location service quality index LPP transport protocol (using LPP over RRC usage indicator or user plane)

Indicator indicating a positioning method (e.g., positioning method index)

Location information request types (e.g., one-time report, periodic, triggered location report)

In step 606, the LMC requested to initiate the positioning procedure may determine and perform a positioning procedure based on the content included in the message received in step 605.

For example, the UE and the LMC may perform a positioning procedure through a protocol (e.g., LPP) that transmits UE positioning. The positioning procedure may be a UE-based positioning method or a UE-assisted positioning method.

In the UE-based positioning method, the UE may directly calculate a location thereof through location measurement information thereof. When the UE measures an expected location, the UE may report an estimated location thereof calculated by the UE to the LMC, which is a location information server through a location measurement protocol (e.g., LPP).

The UE assisted positioning method is a method in which the UE reports measurement information necessary for location measurement thereof to the LMC, which is a location information server, and in which the LMC calculates an expected location of the UE through location measurement information received from the UE.

The RAN node may transmit the ACM mode activation result to the AMF. After updating the RRC configuration corresponding to the received ACM mode activation request, the RAN node may transmit a response (e.g., "always connected mode" activated) indicating that the ACM mode has been successfully activated to the AMF. In case that the RAN node cannot provide an ACM mode activation function, the RAN node may transmit, to the AMF, information that ACM mode activation has failed. In case that the RAN node determines the RRC inactivity timer value and applies the value, the RAN node may transmit the RRC inactivity timer value together with the response to the AMF.

In step 607, the LMC that has completed location measurement for the target UE may transmit a positioning report message to the NG-RAN. The report message may include an identifier for a request in which a recipient associates a location information report for a report corresponding to which request.

A location information report message of the UE may include the following location information reporting contents according to the location information request of the UE.

Current location of the UE in the 3GPP system (e.g., cell identifier, TA identifier, LMC identifier, area of interest or area of interest identifier, presence reporting area or presence reporting area identifier)

Location information according to the geographic area description (GAD) of the UE. Information of the GAD is information that expresses a position of a surface of the Earth's ellipsoid with longitude and latitude, and may include information that further expresses longitude and latitude and inaccurate circle or ellipsoid information, or polygon information configured with a plurality of latitudes/longitudes. In case that high-precision location information is requested, each of latitude and longitude information includes location information of a high-precision format using 32 bits. Otherwise, latitude and longitude information may include latitude/longitude information expressed in 24-bit format.

Movement speed and direction of the UE: Information on a movement speed and direction of the UE calculated based on information that the UE has moved during a designated time Information that has detected a movement of the UE by a specific distance or more: in case that a moved distance of the UE is compared with a distance designated by a threshold and is greater than the threshold, it is determined that the UE has moved, and in case that such determination is made, a report according to UE movement detection may be recorded, and the information may include an indicator indicating UE movement detection and a moved distance or route.

Event information related to the designated location: information that the UE has entered into or left a designated place, information that the UE has moved within a designated place, and information that the UE has continued to remain stationary in a designated place Whether a high-precision location information signal is detected: Information that positioning technology (e.g., UWB, Wi-Fi, BT, etc.) specified by the UE has been detected in the vicinity.

In step 608, the AMF may receive a location information report from the base station. The AMF may identify the request through the location information report received in step 607 and a request identifier included in the location report. The AMF may determine whether to transmit a report message or a response to a location request to which node through information identified by the request identifier.

In step 609a, 609b, or 609c, in case that the AMF receives a request from the UE, as in step 601a, the AMF may transmit a location information report message or a location information request response message to the UE through a NAS message. In case that the AMF receives a UE location information request from the RAN, as in step 601b, the AMF may transmit a location information report or a location information request response message to the RAN. In case that the AMF receives a location information request or a location information service subscription request message from the GMLC, as in step 601c, the AMF may transmit a location information report message or a response message to the location information request to the GMLC.

Embodiment 2

Figure 7:
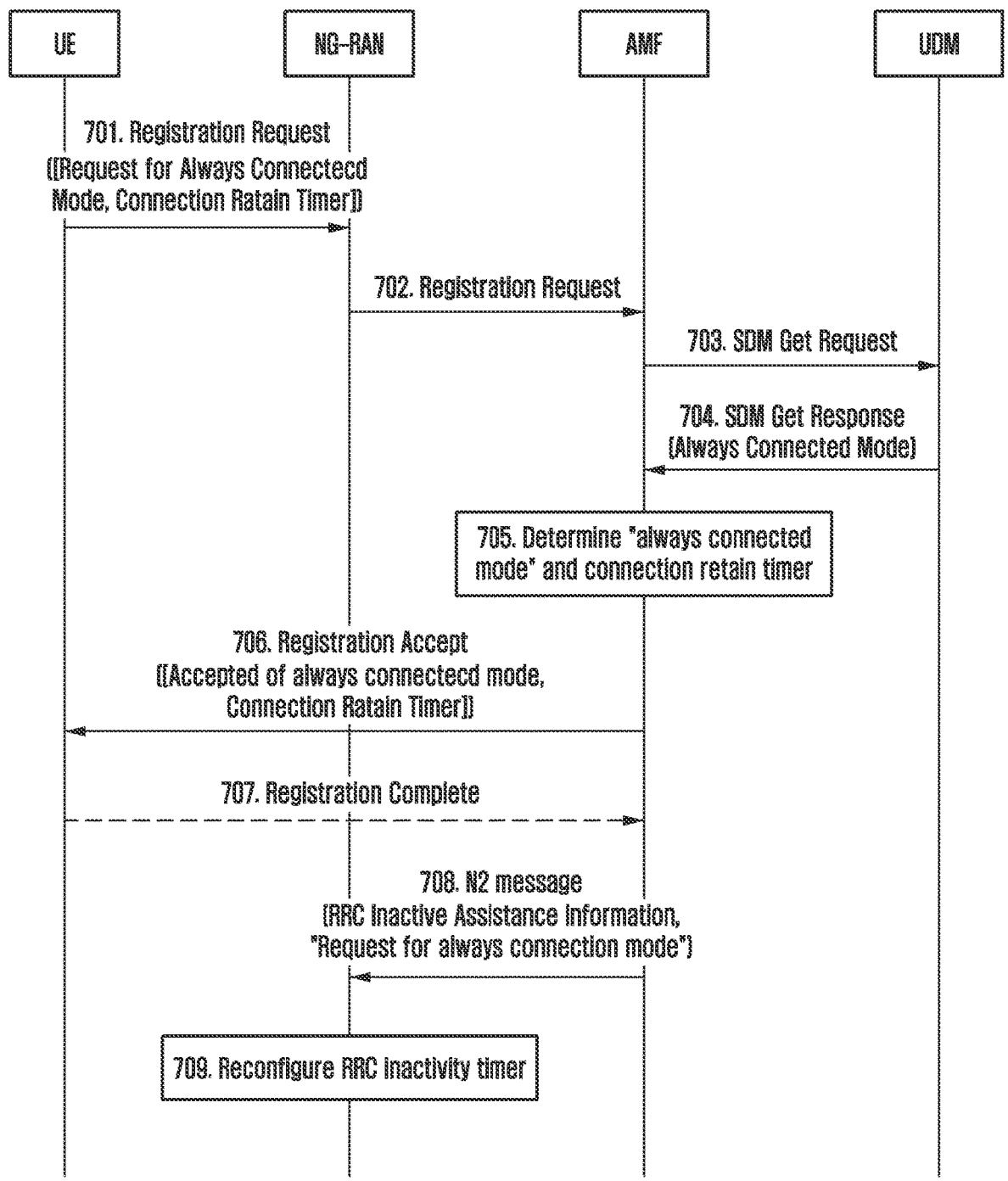
FIG. 7 is a message flow diagram illustrating an always connected mode (AMC) activation process through a registration procedure according to an embodiment of the disclosure.

FIG. 7 is a message flow diagram illustrating an always connected mode (AMC) activation process through a registration procedure according to an embodiment of the disclosure.

With reference to FIG. 7, in step 701, the UE may include an indicator requesting to enter an ACM mode in a registration message (or registration request message) and transmit the registration message (or registration request message) to the AMF. The NG-RAN (base station) may transmit the registration request message to the AMF in step 702.

In case that the AMF receives an ACM mode entry request of the UE in steps 703 to 704, the AMF may identify whether to allow the requested UE to enter the ACM mode by an AMF self-configuration or subscriber information for the UE in the UDM.

In step 705, when the AMF determines whether to allow the requested UE to enter the ACM mode by the subscriber information or the AMF self-configuration, the AMF may determine to enter the UE to the ACM mode, and include the determined information on whether to enter the ACM mode in a registration permission message and transmit the registration permission message to the UE. In step 707, the UE may transmit a registration completion message to the AMF. After determining to enter the ACM mode, the AMF may transmit an N2 message including an ACM mode entry request to the RAN node in step 708. The RAN node may reconfigure the RRC so that the UE does not enter an idle mode during a specific period in step 709. For example, the RAN node may configure the RRC inactivity timer value to a preconfigured very large value (e.g., 30 minutes or 1 hour). Alternatively, the RAN node may receive a time in which the UE should stay in a connected state recommended from the AMF and configure the RRC inactivity timer value to a received time value.

When the RAN node receives time information (e.g., connection retain timer) in which the UE should remain in the connected state, together with the ACM mode activation request indicator from the AMF, the RAN node may configure a connection retain timer value, which is a configuration value for the UE. The connection retain timer is a time at which the UE maintains the ACM mode state, and may be a configuration value separate from the RRC inactivity timer.

In case that the connection retain timer value is less than the RRC inactivity timer value, the connection retain timer value may not be used. After the RRC inactivity timer expires, in case that no traffic is detected, and in case that the ACM mode is not activated, the RAN node may change a state of the UE to the RRC idle state. In case that no traffic is detected during the RRC inactivity timer, when the ACM mode is activated, the AMF may maintain the UE in the RRC connected state. In this case, in order to reduce power consumption of the UE, the RAN node may perform an RRC reconfiguration procedure for adjusting a connection mode DRX cycle for the UE. When no traffic is detected during the connection retain timer value at the RAN node, the RAN node performs an RRC release procedure to change a state of the UE to the RRC idle state.

Embodiment 3-1

Figure 8A:
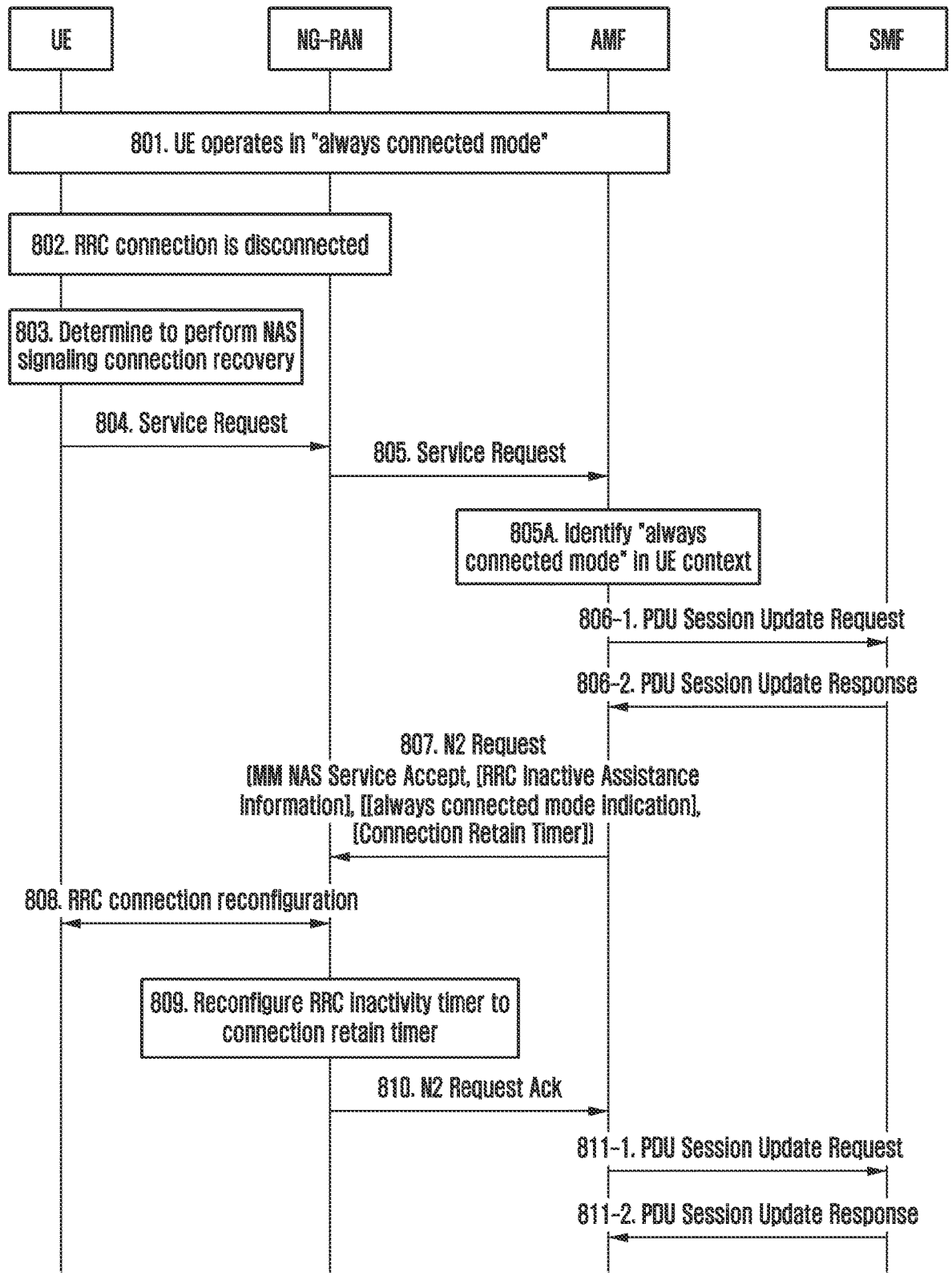
FIG. 8A is a message flow diagram illustrating a NAS recovery procedure utilizing a service request procedure according to an embodiment of the disclosure.

FIG. 8A is a message flow diagram illustrating a NAS recovery procedure utilizing a service request procedure according to an embodiment of the disclosure.

With reference to FIG. 8A, in step 801, the UE may activate an ACM mode through an ACM mode initiation procedure according to Embodiment 1 or 2. When the AMF succeeds in activating the ACM mode for the UE, the AMF may store the ACM mode of the UE in a UE context that manages itself.

In step 802, when an RRC connection of the UE with the base station is disconnected due to various reasons, such as when the UE fails in handover (HO) or enters a shadow area, the UE may enter an RRC idle state.

In step 803, after the UE is disconnected from the RRC connection with the base station to enter the RRC idle state, the UE may determine to recover the NAS connection (NAS signaling connection recovery).

In steps 804 and 805, in order to recover the NAS connection, the UE may transmit a service request to the AMF through the RAN.

In step 805A, the AMF may receive the service request and identify whether the ACM mode has been activated before RRC connection termination from the UE context of the requested UE.

In steps 806-1 and 806-2, the AMF may update the PDU session related to the UE.

In step 807, if an ACM mode has been configured from the UE context, the AMF may transmit an indicator requesting to activate the ACM mode in the N2 request. When the ACM mode has been activated from the UE context, and when the ACM mode is activated, a specific period (validity period) has been designated, and if the validity period of the ACM mode has not expired, the AMF may transmit an indicator requesting to activate the ACM mode and a remaining validity period value (e.g., "connection retain timer") to the RAN node.

In step 808, the RAN node may perform an RRC connection reconfiguration.

In step 809, when the RAN node receives the ACM mode activation request indicator from the AMF through the N2 message, the RAN node may reconfigure a value of the RRC inactivity timer in which the UE configures so as to enter the current RRC idle state. In case that the RAN node receives only the ACM mode activation request indicator without information on a period from the AMF, the RAN node may configure the RRC inactivity timer value to a sufficiently large value, for example, 30 minutes or 1 hour. When the RAN node receives, from the AMF, information (e.g., connection retain timer) on a time in which the UE should stay in the connected state together with the ACM mode activation request indicator, the RAN node may determine the RRC inactivity timer value with reference to the received value and configure the RRC inactivity timer value for the target UE.

When the RAN node receives, from the AMF, time information (e.g., connection retain timer) in which the UE should remain in the connected state together with the ACM mode activation request indicator, the RAN node may configure a connection retain timer value, which is a configuration value for the UE. The connection retain timer is a time at which the UE maintains the ACM mode state, and may be a configuration value separate from the RRC inactivity timer.

In case that the connection retain timer value is less than the RRC inactivity timer value, the connection retain timer value may not be used. After the RRC inactivity timer expires, in case that no traffic is detected, and in case that the ACM mode is not activated, the RAN node may change the state of the UE to the RRC idle state. In case that no traffic is detected during the RRC inactivity timer time, when the ACM mode is activated, the RAN node maintains the UE in the RRC connected state. In this case, in order to reduce power consumption of the UE, the RAN node may perform an RRC reconfiguration procedure for adjusting a connection mode DRX cycle for the UE. If no traffic is detected during the connection retain timer value at the RAN node, the RAN node performs an RRC release procedure to change a state of the UE to the RRC idle state.

In step 810, the RAN node may transmit ACK to the N2 request to the AMF.

In steps 811-1 and 811-2, the AMF may update a PDU session related to the UE with the SMF.

Embodiment 3-2

Figure 8B:
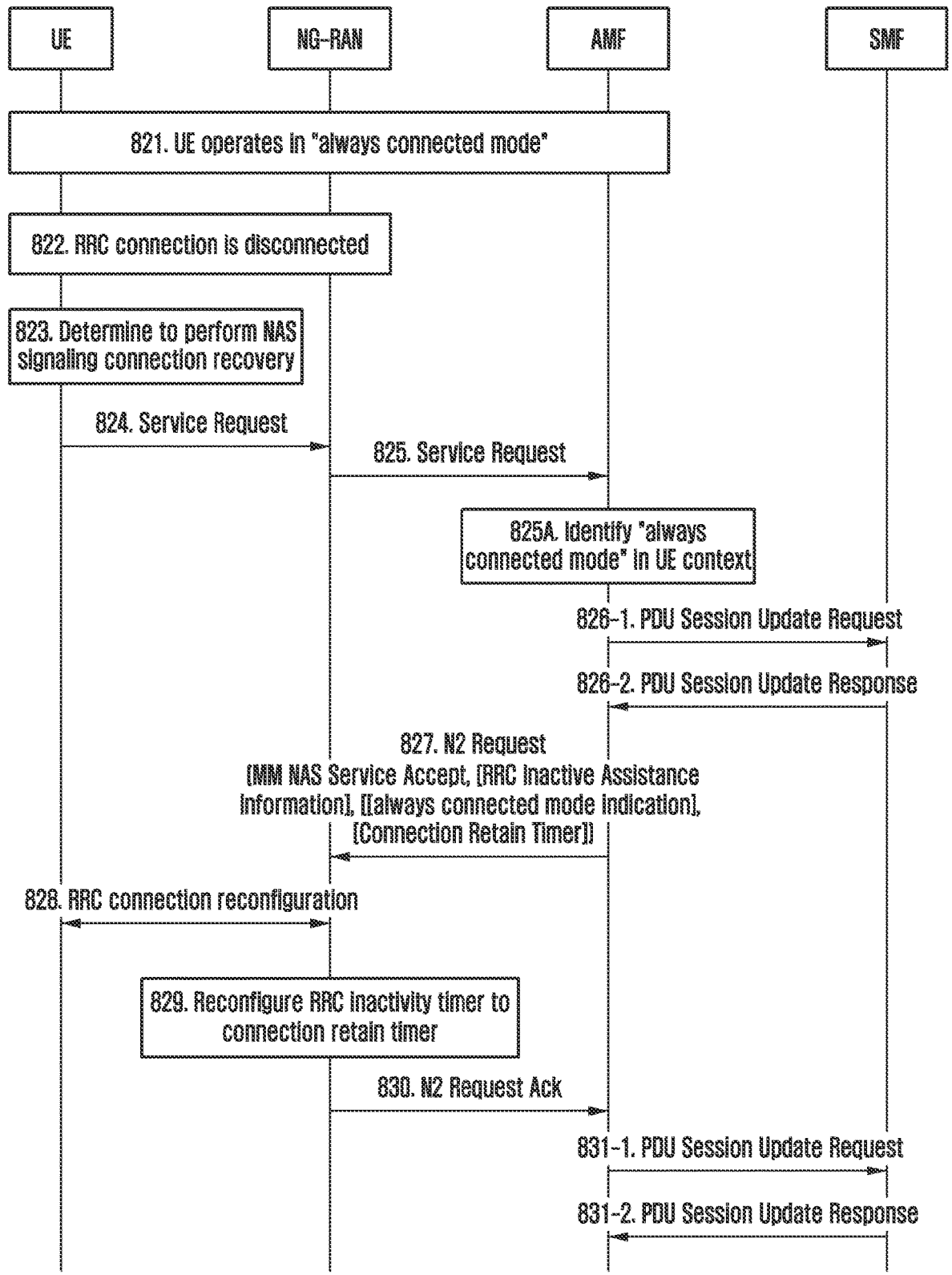
FIG. 8B is a message flow diagram illustrating a NAS recovery procedure utilizing a service request procedure according to another embodiment of the disclosure.

FIG. 8B is a message flow diagram illustrating a NAS recovery procedure utilizing a service request procedure according to another embodiment of the disclosure.

With reference to FIG. 8B, in step 821, the UE may activate an ACM mode through an ACM mode initiation procedure according to Embodiment 1 or 2. When the AMF succeeds in activating the ACM mode for the UE, the AMF may store the ACM mode of the UE in a UE context that manages itself.

In step 822, when an RRC connection of the UE with the base station is disconnected due to various reasons, such as when the UE fails in handover (HO) or enters a shadow area, the UE may enter an RRC idle state.

In step 823, after the UE is disconnected from the RRC connection with the base station to enter the RRC idle state, the UE may determine to recover the NAS connection (NAS signaling connection recovery).

In steps 824 and 825, in order to recover the NAS connection, the UE may transmit a service request to the AMF through the RAN. In this case, the UE may include an indicator (e.g., request for ACM) requesting the ACM mode and a remaining validity period value (e.g., connection retain timer) for the ACM mode configured in step 821 in the service request message.

In step 825A, the AMF may receive the service request and identify whether the UE is a UE in which the ACM mode has been activated before RRC connection termination from the UE context of the requested UE. In this case, the AMF may identify whether the UE is a UE in which the ACM mode has been activated before RRC connection termination based on information (e.g., request for ACM or connection retain timer) related to the ACM mode included in the service request message.

In steps 826-1 and 806-2, the AMF may update a PDU session related to the UE.

In step 827, when the UE has been configured in an ACM mode from the UE context, the AMF may include an indicator requesting to activate the ACM mode in the N2 request and transmit the N2 request to the base station. When the ACM mode has been activated from the UE context, and when the ACM mode is activated, a specific period (validity period) has been designated, and if the validity period of the ACM mode has not expired, the AMF may transmit an indicator requesting to activate the ACM mode and a remaining validity period value (e.g., "connection retain timer") to the RAN node.

In step 828, the RAN node may reconfigure an RRC connection.

In step 829, when the RAN node receives an ACM mode activation request indicator through the N2 message from the AMF, the RAN node may reconfigure a value of the RRC inactivity timer in which the UE configures so as to enter the current RRC idle state. In case that the RAN node receives only the ACM mode activation request indicator without information on a period from the AMF, the RAN node may configure the RRC inactivity timer value to a sufficiently large value, for example, 30 minutes or 1 hour. When the RAN node receives information (e.g., connection retain timer) on a time in which the UE should stay in the connected state together with the ACM mode activation request indicator from the AMF, the RAN node may determine the RRC inactivity timer value with reference to the received value and configure the RRC inactivity timer value for the target UE.

When the RAN node receives time information (e.g., connection retain timer) in which the UE should remain in the connected state together with the ACM mode activation request indicator from the AMF, the RAN node may configure a connection retain timer value, which is a configuration value for the UE. The connection retain timer is a time at which the UE maintains the ACM mode state, and may be a configuration value separate from the RRC inactivity timer.

In case that the connection retain timer value is less than the RRC inactivity timer value, the connection retain timer value may not be used. After the RRC inactivity timer expires, in case that no traffic is detected, and in case that the ACM mode is not activated, the RAN node may change a state of the UE to the RRC idle state. In case that no traffic is detected during the RRC inactivity timer, if the ACM mode is activated, the RAN node may maintain the UE in the RRC connected state. In this case, in order to reduce power consumption of the UE, the RAN node may perform an RRC reconfiguration procedure for adjusting the connection mode DRX cycle for the UE. If no traffic is detected during the connection retain timer value, the RAN node may perform an RRC release procedure to change a state of the UE to the RRC idle state.

In step 830, the RAN node may transmit ACK to the N2 request to the AMF.

In steps 831-1 and 831-2, the AMF may update a PDU session related to the UE with the SMF.

Embodiment 4

Figure 9:
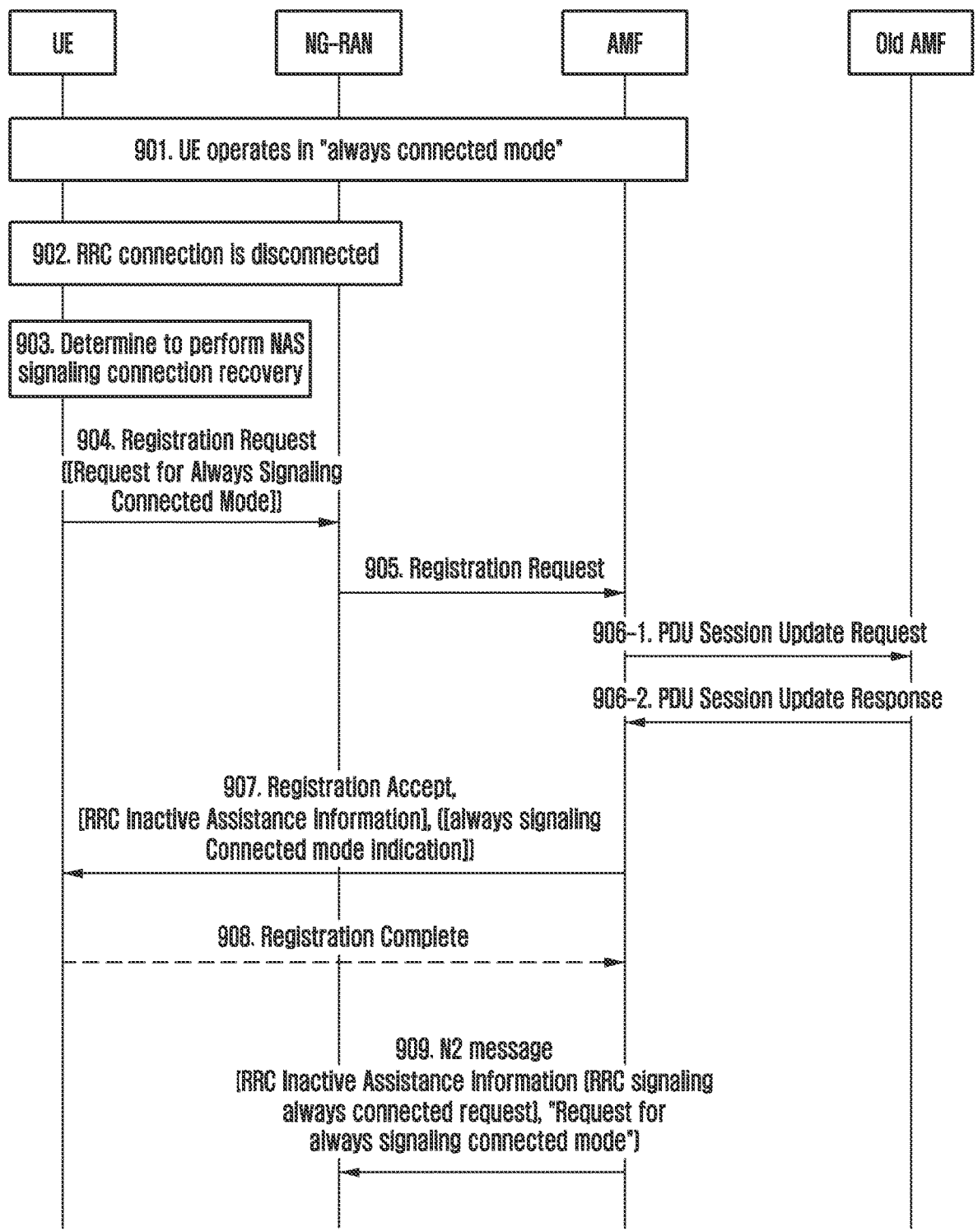
FIG. 9 is a message flow diagram illustrating a NAS recovery procedure utilizing a registration request procedure according to an embodiment of the disclosure.

FIG. 9 is a message flow diagram illustrating a NAS recovery procedure utilizing a registration request procedure according to an embodiment of the disclosure.

With reference to FIG. 9, in step 901, the UE may activate an ACM mode through an ACM mode initiation procedure according to Embodiment 1 or 2. If the AMF succeeds in activating the ACM mode for the UE, the AMF may store the ACM mode of the UE in a UE context that manages itself.

In step 902, when an RRC connection of the UE with the base station is disconnected due to various reasons, such as when the UE fails in handover (HO) or enters a shadow area, the UE may enter an RRC idle state.

In step 903, after the UE is disconnected from the RRC connection with the base station to enter the RRC idle state, the UE may determine to recover the NAS connection.

In steps 904 and 905, in order to recover the NAS connection, the UE may transmit a registration request to the AMF through RAN. The registration request message transmitted by the UE may include an ACM activation request indicator (e.g., request for ACM).

The AMF may receive the registration request message and identify whether the ACM mode has been activated before RRC connection termination from the UE context of the requested UE.

In case that there is no context for the UE and the AMF has identified an old AMF from GUTI information provided by the UE, a new AMF may request to transmit the context of the UE to the existing AMF (old AMF) through step 906-1. Through step 906-2, in the new AMF, a context for the ACM activation mode stored in the existing AMF and information on the left validity period in which the UE should stay in the ACM mode may be stored together. The remaining validity period information may be calculated from recorded time information.

In step 907, in case that an AMF mode has been configured from the UE context or in case that the AMF receives information that the ACM mode has been configured from the existing AMF, in step 909, the AMF may include and transmit an indicator requesting to activate the ACM mode in the N2 request.

Alternatively, according to an embodiment of the disclosure, in step 907, in case that an ACM mode has been configured from the UE context or in case that the AMF receives information that the ACM mode has been configured from the existing AMF, the AMF may transmit a registration accept message to the UE through the RAN node. The registration accept message may include at least one of RRC inactive assistance information or ACM mode indicator information that indicates acceptance of the ACM mode requested by the UE. In step 908, the AMF may receive a registration complete message from the UE. In step 909, the AMF may include and transmit an indicator requesting to activate the ACM mode in the N2 request and transmit the N2 request. Further, the AMF may include RRC inactive assistance information including an RRC signaling always connected request in the N2 request and transmit the N2 request. When the ACM mode has been activated from the UE context, and when the ACM mode is activated, a specific period (validity period) has been designated, and if the validity period of the ACM mode has not expired, the AMF may transmit an indicator requesting to activate the ACM mode and a remaining validity period value (e.g., "connection retain timer") to the RAN node.

When an ACM mode has been activated from the UE context, and when the ACM mode is activated, a specific period (validity period) has been designated, and if the validity period of the ACM mode has not expired, the AMF may transmit an indicator requesting to activate the ACM mode and a remaining validity period value (e.g., "connection retain timer") to the RAN node.

The RAN node may perform an RRC connection reconfiguration. When the RAN node receives an ACM mode activation request indicator from the AMF through the N2 message, the UE reconfigures a value of the RRC inactivity timer in which the UE configures so as to enter the current RRC idle state. In case that the RAN node receives only the ACM mode activation request indicator without information on a period from the AMF, the RAN node may configure the RRC inactivity timer value to a sufficiently large value, for example, 30 minutes or 1 hour.

When the RAN node receives, from the AMF, information (e.g., connection retain timer) on a time in which the UE should stay in the connected state together with the ACM mode activation request indicator, the RAN node may determine the RRC inactivity timer value with reference to the received value, and configure the RRC inactivity timer value for the target UE.

When the RAN node receives, from the AMF, time information (e.g., connection retain timer) in which the UE should remain in the connected state together with the ACM mode activation request indicator, the RAN node may configure a connection retain timer value, which is a configuration value for the UE. The connection retain timer is a time at which the UE maintains the ACM mode state, and may be a configuration value separate from the RRC inactivity timer.

In case that the connection retain timer value is less than the RRC inactivity timer value, the connection retain timer value is not used. After the RRC inactivity timer expires, in case that no traffic is detected, and in case that the ACM mode is not activated, the RAN node may change a state of the UE to the RRC idle state. In case that no traffic is detected during the RRC inactivity timer time, if the ACM mode is activated, the UE may maintain the RRC connected state. In this case, in order to reduce power consumption of the UE, the RAN node may perform an RRC reconfiguration procedure for adjusting a connection mode DRX cycle for the UE. If no traffic is detected during the connection retain timer value, the RAN node may perform an RRC release procedure to change the state of the UE to the RRC idle state.

Embodiment 5

Figure 10:
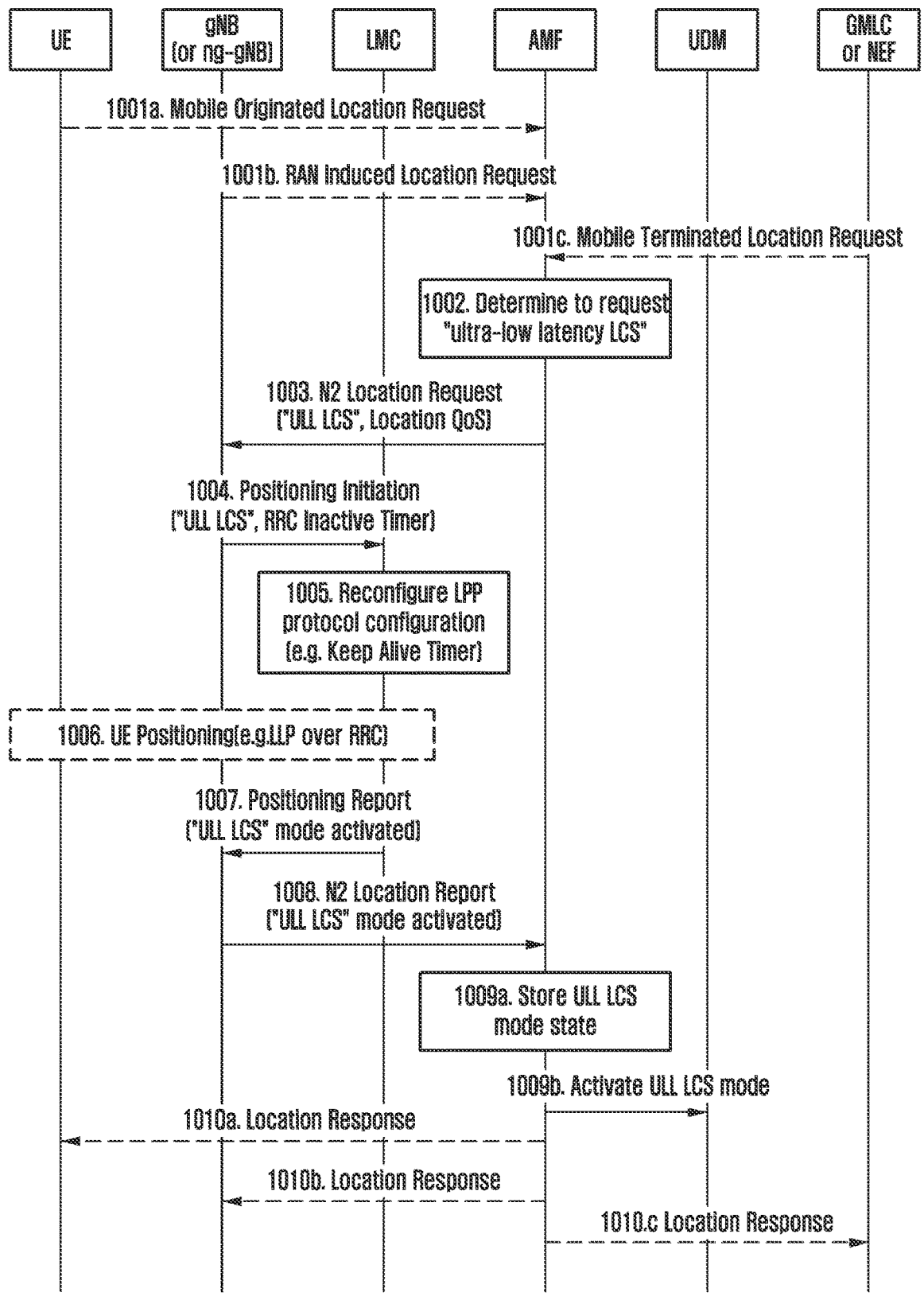
FIG. 10 is a message flow diagram illustrating a method of changing a configuration of a periodic value of a periodic message transmission and reception procedure of parameters of an LPP protocol at an LMC node to maintain a terminal to an RRC connected state in case that an AMF activates an ultra-low latency LCS mode according to an embodiment of the disclosure.

FIG. 10 is a message flow diagram illustrating a method for an LMC node to change a configuration of a periodic value of a periodic message transmission and reception procedure of parameters of an LPP protocol to maintain a UE to an RRC connected state in case that an AMF activates an ultra-low latency LCS mode according to an embodiment of the disclosure.

With reference to FIG. 10, steps 1001a to 1001c may be the same as or similar to steps 601a to 601c of FIG. 6.

The AMF may receive a location information request in steps 1001a to 1001c. In step 1002, the AMF may determine to activate an ultra-low latency LCS mode based on contents included in a service request included in steps 1001a to 1001c.

In case that a required service response time included in a location information service request is less than or equal to a specific value, the AMF may determine to activate the ultra-low latency LCS mode.

In case that a location information service identifier or service type included in the location information service request requests an ultra-low delay service response, the AMF may determine to activate the ultra-low latency LCS mode of the target UE.

In case that service quality information included in the location information service request is assured, in order to perform UE positioning within the required service response time, the AMF may determine to activate the ultra-low latency LCS mode of the target UE.

The AMF may determine the state of the target UE to ultra-low delay LCS mode activation of the target UE based on a location information service quality classification index included in the location information service request and information pre-connected with the location information service quality classification index.

Further, the AMF may determine to activate the ultra-low latency LCS mode of the target UE in consideration of the QoS class included in the location information service request. For example, there may be cases where the QoS class is assured and best effort, the QoS class is an assured class that should satisfy a service quality requested by the required location information service request, and for example, in case that the location information service quality index is 4 or 6, the AMF may determine to activate the ultra-low latency LCS mode of the target UE.

In case that the location information service request occurs continuously during a specific period rather than one-time occurrence, the AMF may receive information on a continuously occurrence possible period together with a location information service request, and enable the RRC state of the UE to become a connected state during the period. That is, by performing step 1003 so that the UE may stay in the CONNECTED mode during the requested time, the AMF may initiate an activation procedure of the ultra-low delay LCS mode of the target UE.

When the AMF determines to activate the ultra-low latency LCS mode of the target UE, the AMF may store information on whether to activate the ultra-low latency LCS mode in the UE context.

In step 1003, the AMF may include an indicator (e.g., ULL LCS) for requesting to activate an ultra-low latency LCS mode together with a location information service request in an N2 location request message and transmit the N2 location request message to the RAN. The location information service request message may include a location information service request received by the AMF in steps 1001*a* to 1001*c*. The location information request message may include requirements (e.g., location quality-of-service (QoS)) for location information service quality information including a service response time. Alternatively, requirements for service quality information may be derived from the location information service identifier or service type.

When the RAN node (gNB or ng-gNB) receives the N2 location request message from the AMF, the RAN node (gNB or ng-gNB) may transmit a UE positioning request message (or positioning request initiation message or positioning initiation message, hereinafter, may be used interchangeably) to the LMC in step 1004. The RAN node may transmit together the ultra-low delay LCS request indicator received from the AMF in the UE positioning request initiation message. The RAN node may transmit, to the LMC node, an RRC inactivity timer value, which is an RRC configuration value indicating a time during which the UE stays in the RRC connected state in case that no traffic is detected.

The NG-RAN node that has received the N2 location control request may determine the following based on information included in the location control request.

Whether the NG-RAN node (gNB or ng-gNB) transmits the location information request to the LMC In case that there are a plurality of LMCs, an LMC to perform a location information request of the target UE may be selected among the LMCs.

An LMC that supports a positioning method included in the N2 location control request may be selected among the LMCs.

An LCS that provides an ultra-low latency LCS may be selected.

In case that there is an LMC capable of performing the N2 location control request, the NG-RAN may initiate a positioning request procedure to the LMC. For example, the base station may transmit a positioning request initiation message to the LMC. The positioning request initiation message may include contents included in the N2 position control request message received from the AMF. For example, the contents included in the control request message may be as follows.

Location service quality related information: information that maps location information precision and location information service response time information to precision, service response time, or location service quality index LPP transport protocol (using LPP over RRC usage indicator or user plane)

Indicator indicating a positioning method (e.g., positioning method index)

Location information request type (e.g., one-time report, periodic, triggered location report)

In step 1005, the LMC node may receive together the ultra-low delay LCS request indicator and the RRC inactivity timer value from the RAN, and configure a periodic value (e.g., keep alive timer) of an LPP message periodically generated in order to remain the UE in an always connected mode to a value smaller than an RRC inactivity timer value received from the base station. The LMC node may transmit the configured period value to the UE to configure a period value for the UE to transmit and receive through the LPP protocol.

In step 1006, the LMC requested to initiate the positioning procedure may determine and perform the positioning procedure based on the content included in the message received in step 1005.

For example, the UE and the LMC may perform a positioning procedure through a protocol (e.g., LPP) that transmits UE positioning. The positioning procedure may be performed according to UE-based positioning or UE-assisted positioning.

In step 1007, the LMC that has completed location measurement for the target UE may transmit a positioning report message to the RAN node. The report message may include an identifier for a request with which a recipient associates a location information report for the report corresponding to which request. In case that the LMC node is configured to the ultra-low latency LCS mode, the LMC node may transmit a message including a report on the result of successfully switching to the ultra-low latency LCS mode to the RAN node.

The location information report message of the UE may include at least one of the following location information according to the location information request of the UE.

Current location in the 3GPP system of the UE (e.g., cell identifier, TA identifier, LMC identifier, area of interest or area of interest identifier, presence reporting area or presence reporting area identifier)

Location information according to the geographic area description (GAD) of the UE. GAD information is information that expresses a location of the Earth's ellipsoid surface with longitude and latitude and may include information that further expresses longitude and latitude and inaccurate circle or ellipsoid information, or polygon information configured with a plurality of latitudes/longitudes. In case that high-precision location information is requested, each of latitude and longitude information includes location information of a high-precision format using 32 bits. Otherwise, each of latitude and longitude information may include latitude/longitude information expressed in 24-bit format.

Movement speed and direction of the UE: Information on a movement speed and direction of the UE calculated based on information that the UE has moved during a designated time Information that has detected a movement of the UE by a specific distance or more: In case that a moved distance of the UE is compared with a distance designated by a threshold and is greater than the threshold, it is determined that the UE has moved, and in case that such determination is made, a report according to UE movement detection may be recorded, and the information may include an indicator indicating UE movement detection and the moved distance or path.

Event information related to the designated location: information that the UE has entered or left a designated place, information that the UE has moved within a designated place, and information that the UE has continued to remain stationary in a designated place Whether a high-precision location information signal is detected: Information that positioning technology (e.g., UWB, Wi-Fi, BT, etc.) specified by the UE has been detected in the vicinity.

Whether to activate the ultra-low latency LCS mode

In step 1008, the AMF may receive a location information report from the base station. The AMF may identify the request through the location information report received in step 1007 and a request identifier included in the location report. The AMF may determine to which node to transmit a report message or a response to a location request through information identified by the request identifier. The message may include a result report in which the RAN node indicates whether the ultra-low latency LCS mode has been activated.

In step 1009a, the AMF may store information on whether the ultra-low delay LCS mode or the ultra-low delay LCS is activated in the UE context. In step 1009b, the AMF may store information on whether the ultra-low latency LCS has been activated in a separate NF such as separate UDM. In case that the RRC is released because the UE fails handover or moves to a shadow area, the AMF may determine to recover the NAS connection and perform a NAS connection recovery procedure of the UE using a service request or registration procedure in order to recover the NAS connection. When performing such a NAS connection recovery procedure, the AMF may resume the ultra-low latency LCS service to the RAN with ultra-low latency LCS activation information stored in the UE context. A procedure for the AMF to resume the ultra-low delay LCS activation mode may perform the same procedure as in steps 1003 to 1008 of this embodiment.

In step 1010a, 1010b, or 1010c, in case that the AMF receives a request from the UE as in step 1001a, the AMF may transmit a location information report message or a location information request response message to the UE through a NAS message. In case that the AMF receives a UE location information request from the RAN, as in step 1001b, the AMF may transmit a location information report or a location information request response message to the RAN. In case that the AMF receives a location information request or a location information service subscription request message from the GMLC, as in step 1001c, the AMF may transmit a location information report message or a response message to the location information request to the GMCL Embodiment 6

Figure 11:
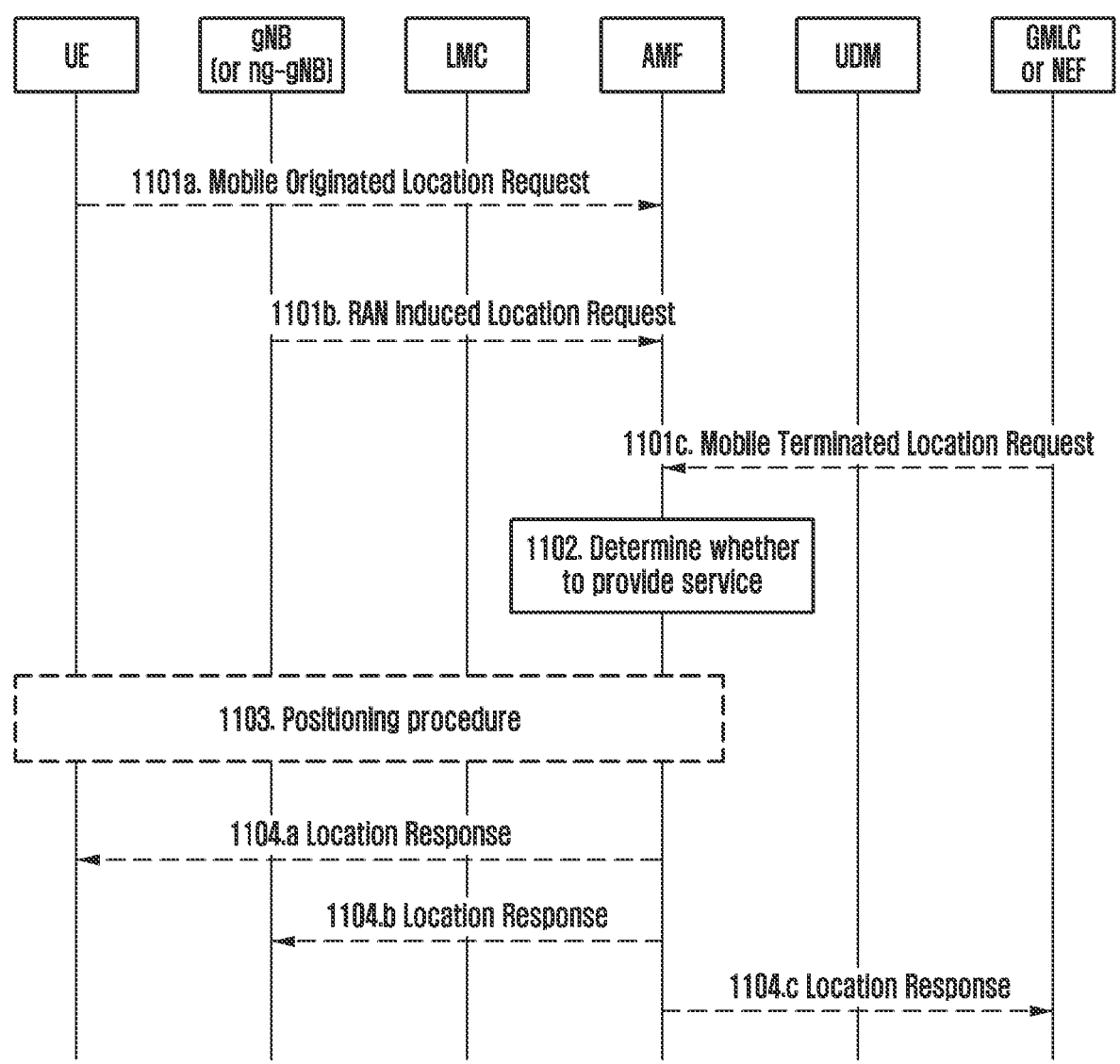
FIG. 11 is a message flow diagram illustrating a method for an AMF to receive a location information request, to view a CM state service response time and service quality information of a terminal, and to determine whether there is an error for a location information service request according to an embodiment of the disclosure.

FIG. 11 is a message flow diagram illustrating a method for an AMF to receive a location information request, to view a CM state service response time and service quality information of a UE, and to determine whether there is an error for a location information service request according to an embodiment of the disclosure.

With reference to FIG. 11, steps 1101a to 1101c may be the same as or similar to steps 601a to 601c of FIG. 6.

In step 1102, the AMF may determine a connection management state (CM state) of the UE, a required service response time, a QoS class (assured or best effort), and whether a report error. Further, the AMF may determine whether a currently requested location information service may be provided with information including a capability of the UE and a capability of the network.

For example, in case of a CM-IDLE state of the UE, in case that the required service quality index corresponds to 4 or 6, or in case that the required service response time is less than the configured threshold, and in case that the QoS class is assured, it may be determined that the AMF cannot satisfy the location information request within the required response time. In case that the AMF does not satisfy the required response time, the AMF may determine that there is an error in the location information service, and transmit a message including the error and the reason for the error in the response message. The reason for the error may be the following example.

Unable to meet a required response time

Cannot provide precision of location information required for the target UE

The target UE is outside an area that can provide the required location information precision Because the target UE does not provide a location information service, required location information precision may not be provided The current network does not provide required location information precision The AMF that has received the location information request in step 1101a, 1101b, or 1101c may transmit a response message without performing a procedure (e.g., steps 603-608 of Embodiment 1) for identifying location information of the UE. Alternatively, according to an embodiment, in case that it is determined that the AMF that has received the location information request in step 1101a, 1101b, or 1101c cannot provide a service, the AMF may not perform a procedure (step 1103) for obtaining location information of the UE but may transmit a response message in step 1104a, 1104b, or 1104c. In case that it is determined that the AMF may provide a service, the AMF may acquire location information of the UE in the same manner as in the above-described embodiment in step 1103 and transmit a response message in step 1104a, 1104b, or 1104c.

Embodiment 7

Figure 12:
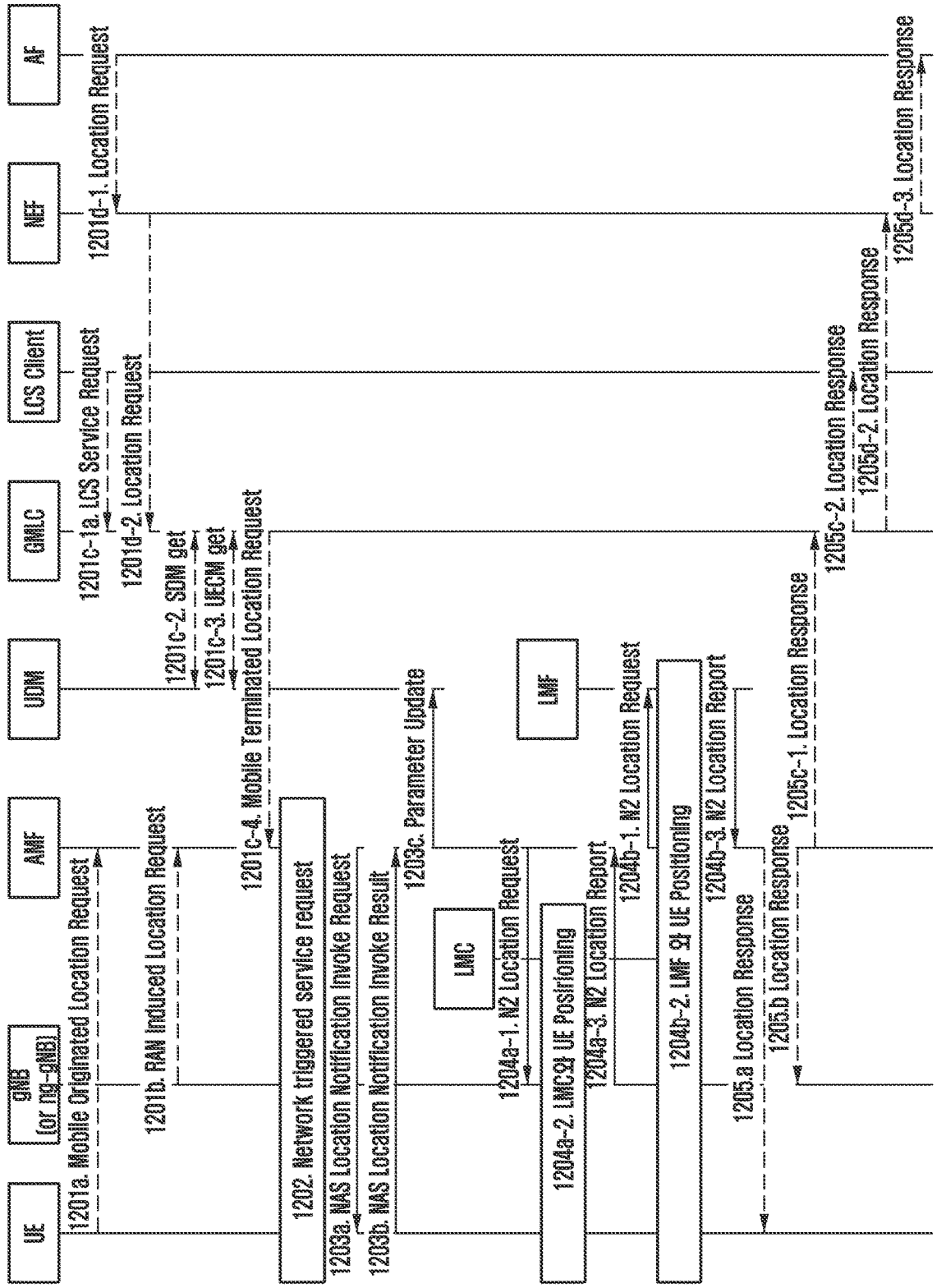
FIG. 12 is a message flow diagram illustrating an operation in which a GMLC receives a location information service request from an NEF or AF according to an embodiment of the disclosure.

FIG. 12 is a message flow diagram illustrating an operation in which a GMLC receives a location information service request from an NEF or AF according to an embodiment of the disclosure.

The location information request message may have requirements for a service response time. For example, requirements for the corresponding service response time may be known from a service quality classification index, as illustrated in Table 1.

With reference to FIG. 12, in step 1201a, the AMF may receive a location information service request. In case that the AMF has received the service response time or the included location information service and may infer a required service response time from information included in the location information service request, and in case that the required service response time is a threshold or less and a service quality type is an assured class, the AMF may configure a location information service response timer for the required service. Thereafter, the AMF may perform a personal information identification procedure for determining a location of the UE and a procedure for determining a UE location through steps 1202 to 1204a-3 or 1202 to 1204b-3. When the timer expires while performing steps 1202 to 1204a-3 or 1202 to 1204b-3, the AMF may transmit a location information response message to the UE, as in step 1205*a*, and stop performing additional steps while performing steps 1202 to 1204*a*-3 or 1202 to 1204*b*-3.

Even in case that the AMF receives a request for a location information service from the RAN, as in step 1201*b*, the same procedure as in step 1201*a* may be performed.

Even in case that the AMF receives a location information service request from the GMLC, as in steps 1201*c*-1 to 1201*c*-4, the same procedure as in step 1201*a* may be performed.

In step 1201*c*-1*a*, in case that the GMLC receives a location information request from the LCS client or in case that the GMLC receives a location information request from the NEF as in steps 1201*d*-1 and 1201*d*-2, the GMLC may transmit the location information request to the AMF.

After the GMLC or the NEF transmits the location information request to the AMF, in case that the GMLC or the NEF has received the service response time or included location information service, in case that the required service response time may be inferred from information included in the location information service request, in case that the required service response time is less than or equal to the threshold, and in case that the service quality type is an assured class, the GMLC may configure a timer to the required service response time.

After the GMLC transmits the location information request to the AMF, before the GMLC receives a response to the location information request from the AMF, when the configured timer expires, the GMLC may transmit a response message of the location information service to the LCS client or the NEF.

In case that the NEF receives a location information service request message from the AF, the NEF may configure the timer in the same manner as in the GMLC and transmit a response message to the AF when the timer expires.

Contents of the response message to be transmitted when the timer expires may be the same as those in steps 1205*c*-2, 1205*d*-2, and 1205*d*-3.

In step 1202, the AMF may identify a state of the UE, and in case that the UE is in a CM idle state, the AMF may transmit a network triggered service request.

In steps 1203-1 and 1203-2, the AMF may transmit a message requesting verification of personal information to the UE with a NAS message. Further, the AMF may receive a response message to personal information verification.

The UE may obtain information on whether to consent to verification of use of personal information from the user, and transmit information on whether the user consents to a request for verification of personal information of the UE to the AMF. The AMF may proceed to the next step according to whether the user's consent. Alternatively, in case that the user does not consent, the AMF may stop the location information service procedure and transmit a response message to the location information service, as in step 1205*a*, 1205*b*, or 1205*c*-1. In case that the AMF obtains, from the user, a response message stating that the user refuses to consent to the location information service, the AMF may determine that user location information acquisition has failed, and record it in the UDM through step 1203-3. In case that the AMF determines that the user consent is rejected, the AMF may transmit a response message including the reason that the user consent is rejected to the UE, the RAN, and the GMLC in step 1205*a*, 1205*b*, or 1205*c*-1. In case that the AMF does not receive a response message according to step 1203-2 during a designated time, the AMF may determine that the user's consent is withheld or rejected according to the operator's policy on consent to use of location information. In case that the AMF determines that the user consent is withheld, the AMF may continue the location information acquisition procedure in steps 1204*a*-1 to 1204*a*-3 or steps 1204*b*-1 to 1204*b*-3. In case that the AMF determines that the user consent is rejected, the AMF may stop a UE location determination procedure in steps 1204*a*-1 to 1204*a*-3 or steps 1204*b*-1 to 1204*b*-3 and transmit a response message to the location information service, as in step 1205*a*, 1205*b*, or 1205*c*-1.

In steps 1204*a*-1 to 1204*a*-3, the AMF may perform an LMC-based UE location information acquisition procedure. Alternatively, in steps 1204*b*-1 to 1204*b*-3, the AMF may perform an LMF-based UE location information acquisition procedure.

In step 1205*a*, 1205*b*, or 1205*c*-1, in case that the AMF receives a request from the UE, as in step 1201*a*, the AMF may transmit a location information report message or a location information request response message to the UE through a NAS message. In case that the AMF receives a UE location information request from the RAN, as in step 1201*b*, the AMF may transmit a location information report or a location information request response message to the RAN. In case that the AMF receives a location information request or a location information service subscription request message from the GMLC, as in step 1201*c*-4, the AMF may transmit a location information report message or a response message to the location information request to the GMLC. In step 1205*c*-1, the GMLC may receive a location response message from the AMF. Because the service quality type is an assure class, the configured timer has expired; thus, in case that the GMLC has already transmitted a service response message to the LCS client or the NEF by a request for a low-delay service response time, the GMLC may ignore the location information response message received from the AMF and may not transmit a response message to the LCS Client in step 1205*c*-2. For the same reason, the GMLC may not transmit the location information response message to the NEF, as in steps 1205*d*-2 and 1205*d*-3.

Between the above-described embodiments and methods in the disclosure, each constitution or step may be selectively coupled/combined and applied. Further, in the above-described embodiments and methods, all of the above steps are not necessarily included, and some steps may be omitted according to a configuration and/or definition on the system.

Figure 13:
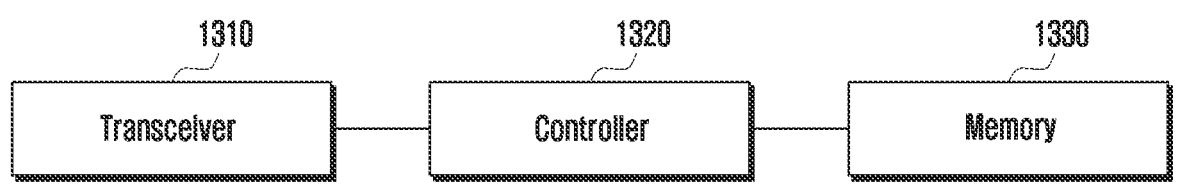
FIG. 13 is a block diagram illustrating a structure of a UE according to an embodiment of the disclosure.

FIG. 13 is a block diagram illustrating a structure of a UE according to an embodiment of the disclosure.

With reference to FIG. 13, the UE may include a transceiver 1310, a controller 1310, and a memory 1330. The UE may additionally have more components according to the implementation. For example, the UE may further include various additional devices such as displays, inputs, and sensors for a user interface. In the disclosure, there is no restriction on these additional constitutions.

The transceiver 1310 may be connected with the gNB or NG-RAN through a wireless channel based on each of the embodiments described in FIGS. 1 to 12, and transmit and receive signals and/or messages to and from various network function devices through the gNB or NG-RAN. In case that the UE communicates with a 5G network, the transceiver 1310 may be a device capable of transmitting and receiving to and from the 5G communication network. Further, the transceiver 1310 may include a communication processor, as needed.

In case that the transceiver 1310 does not include a communication processor, all signals and/or messages may be processed by the controller.

The controller 1320 may control the basic operation of the UE and perform the control of reception and storage of the messages described above. For example, the controller 1320 may perform various operations based on the above description.

The memory 1030 may store various data necessary for the control of the UE, and have an area for storing various messages described above.

Figure 14:
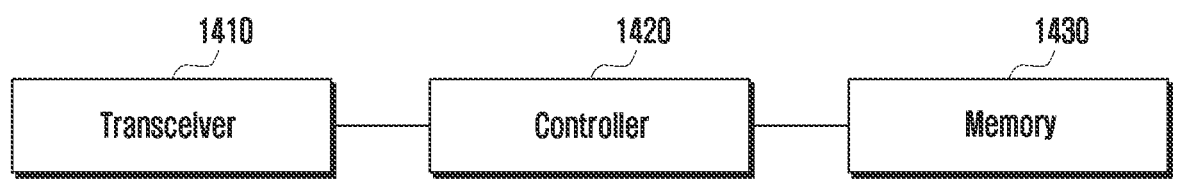
FIG. 14 is a block diagram illustrating a structure of a gNB according to an embodiment of the disclosure.

FIG. 14 is a block diagram illustrating a structure of a gNB according to an embodiment of the disclosure.

With reference to FIG. 14, the gNB may include a transceiver 1410, a controller 1410, and a memory 1430. The gNB may additionally have more components according to the implementation. For example, the gNB may further include various additional devices such as displays, inputs, and sensors for a user interface. In the disclosure, there is no restriction on such an additional constitution.

The transceiver 1410 may be connected to the UE through a wireless channel based on each of the embodiments described in FIGS. 1 to 12, and transmit and receive signals and/or messages to and from various network function devices. In case that the gNB communicates with a 5G network, the transceiver 1410 may be a device capable of transmitting and receiving to and from a 5G communication network. Further, the transceiver 1410 may include a communication processor, as needed.

In case that the transceiver 1410 does not include a communication processor, all signals and/or messages may be processed by the controller.

The controller 1420 may control the basic operation of the gNB and perform the control of reception and storage of the messages described above. Further, the controller 1420 may perform the control for transmitting or receiving data through a particular network slice. For example, the controller 1420 may perform various operations of the gNB based on the above description. For example, the controller 1420 may control the transceiver to receive, from the access and mobility management function (AMF), a first message including at least one of information requesting activation of a connection mode of the UE for a location information service of the UE or information on a time related to the connection mode, configure a timer value for maintaining a connected state of the UE in order to measure location information of the UE based on at least one of information requesting activation of the connected mode or information on a time related to the connected mode, and control the transceiver to transmit a second message including information on whether to activate the connection mode to the AMF in response to the first message.

The memory 1430 may store various data necessary for the control of the gNB and have an area for storing various messages described above.

Figure 15:
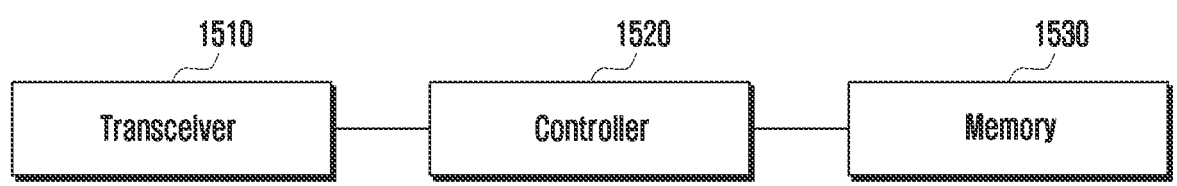
FIG. 15 is a block diagram illustrating a structure of an NG-RAN according to an embodiment of the disclosure.

FIG. 15 is a block diagram illustrating a structure of an NG-RAN according to an embodiment of the disclosure.

With reference to FIG. 15, the NG-RAN may include a transceiver 1510, a controller 1510, and a memory 1530. The NG-RAN may additionally have more components according to the implementation. For example, the NG-RAN may further include various additional devices such as displays, inputs, and sensors for the user interface. In the disclosure, there is no restriction on such an additional configuration.

The transceiver 1510 may be connected to the UE through a wireless channel based on each of the embodiments described in FIGS. 1 to 12, and transmit and receive signals and/or messages to and from various network function devices. In case that the NG-RAN communicates with a 5G network, the transceiver 1510 may be a device capable of transmitting and receiving to and from a 5G communication network. Further, the transceiver 1510 may include a communication processor, as needed.

In case that the transceiver 1510 does not include a communication processor, all signals and/or messages may be processed by the controller.

The controller 1520 may control the basic operation of the NG-RAN and perform the control of reception and storage of the messages described above. Further, the controller 1520 may perform the control for transmitting or receiving data through a particular network slice. For example, the controller 1520 may perform various operations of the NG-RAN based on the above description. For example, the controller 1520 may control the transceiver to receive, from the access and mobility management function (AMF), a first message including at least one of information requesting activation of a connection mode of the UE for a location information service of the UE or information on a time related to the connection mode, configure a timer value for maintaining a connected state of the UE in order to measure location information of the UE based on at least one of information requesting activation of the connected mode or information on a time related to the connected mode, and control the transceiver to transmit a second message including information on whether to activate the connection mode to the AMF in response to the first message.

The memory 1530 may store various data necessary for the control of the NG-RAN and have an area for storing various messages described above.

Figure 16:
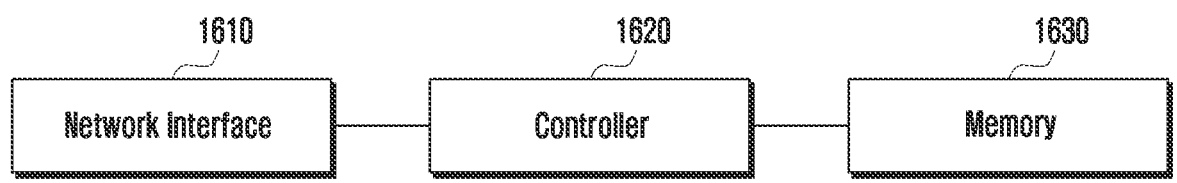
FIG. 16 is a block diagram illustrating a structure of an AMF according to an embodiment of the disclosure.

FIG. 16 is a block diagram illustrating a structure of an AMF according to an embodiment of the disclosure.

With reference to FIG. 16, the AMF may communicate with other network entities of a core network through a network interface 1610. For example, the AMF may perform communication with an UE, gNB, NG-RAN, UDM, SMF, LMC, LMF, GMLC, NEF, LCS client, AF, and the like.

A controller 1620 may be implemented into at least one processor and/or program for performing an operation of the AMF. For example, the controller 1620 may perform an operation of the AMF described above. For example, the controller 1620 may determine a connection mode of the UE for a location information service of the UE, control the transceiver to transmit, to the base station, a first message including at least one of information requesting activation of the connection mode or information on a time related to the connection mode, and control the transceiver to receive a second message including information on whether to activate the connected mode from the base station in response to the first message. In this case, a timer value for maintaining a connected state of the UE may be configured to measure location information of the UE based on at least one of information requesting activation of the connected mode or information on a time related to the connected mode.

The memory 1630 may store programs and various control information necessary for the controller 1620, and store each information described in the disclosure. Other network entities may store information necessary for the operation described above in the same manner.

In addition to the constitution described above, the AMF may further include various interfaces for access with the operator. In the disclosure, there is no particular limitation on such an additional constitution.

Figure 17:
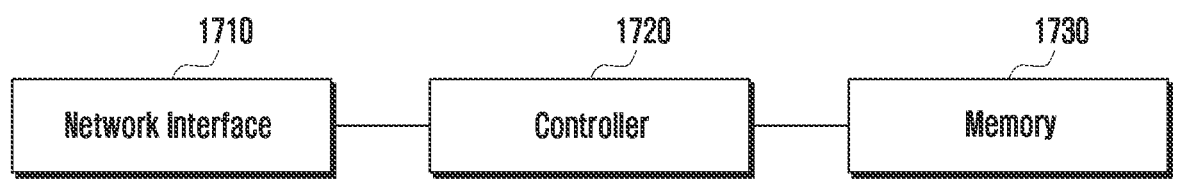
FIG. 17 is a block diagram illustrating a structure of an SMF according to an embodiment of the disclosure.

FIG. 17 is a block diagram illustrating a structure of an SMF according to an embodiment of the disclosure.

With reference to FIG. 17, the SMF may communicate with other network entities of a core network through a network interface 1710. For example, the SMF may perform communication with an UE, gNB, NG-RAN, UDM, AMF, LMC, LMF, GMLC, NEF, LCS client, AF, and the like.

A controller 1720 may be implemented into at least one processor or/and program for performing an operation of the SMF. For example, the controller 1720 may perform the operation of the SMF described above.

A memory 1730 may store programs and various control information necessary for the controller 1720, and store each information described in the disclosure. Other network entities may store information necessary for the operation described above in the same manner.

In addition to the constitution described above, the SMF may further include various interfaces for access with the operator. In the disclosure, there is no particular limitation on such an additional constitution.

Figure 18:
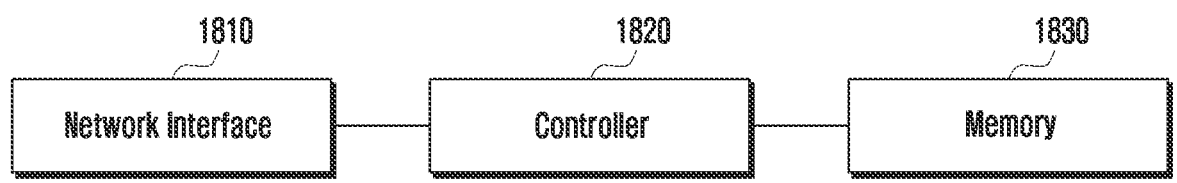
FIG. 18 is a block diagram illustrating a structure of an LMC according to an embodiment of the disclosure.

FIG. 18 is a block diagram illustrating a structure of an LMC or LMF according to an embodiment of the disclosure.

With reference to FIG. 18, the LMC or LMF may communicate with other network entities of a core network through a network interface 1810. For example, the LMC or LMF may communicate with an UE, gNB, NG-RAN, UDM, AMF, SMF, GMLC, NEF, LCS client, AF, and the like.

A controller 1820 may be implemented into at least one processor or/and program for performing an operation of the LMC or LMF. For example, the controller 1820 may perform an operation of the LMC or LMF described above.

A memory 1830 may store programs and various control information necessary for the controller 1820, and store each information described in the disclosure. Other network entities may store information necessary for the operation described above in the same manner.

In addition to the configuration described above, the LMC or LMF may further include various interfaces for access with the operator. In the disclosure, there is no particular limitation on such an additional configuration.

Figure 19:
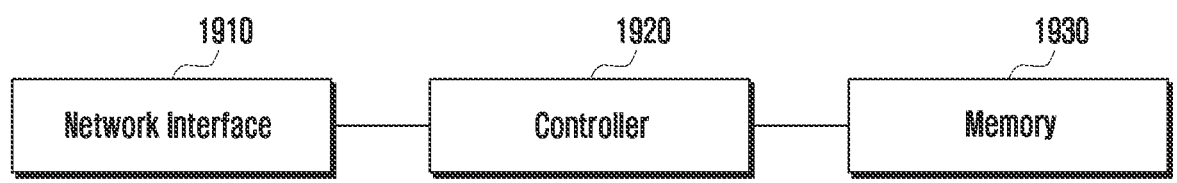
FIG. 19 is a block diagram illustrating a structure of a UDM according to an embodiment of the disclosure.

FIG. 19 is a block diagram illustrating a structure of a UDM according to an embodiment of the disclosure.

With reference to FIG. 19, the UDM may communicate with other network entities of a core network through a network interface 1910. For example, the UDM may communicate with an UE, GNB, NG-RAN, LMC, LMF, AMF, SMF, GMLC, NEF, LCS client, AF, and the like.

A controller 1920 may be implemented into at least one processor and/or program for performing an operation of the UDM. For example, the controller 1920 may perform an operation of the UDM described above.

A memory 1930 may store programs and various control information necessary for the controller 1920, and store each information described in the disclosure. Other network entities may store information necessary for the operation described above in the same manner.

In addition to the constitution described above, the UDM may further include various interfaces for access with the operator. In the disclosure, there is no particular limitation on such an additional constitution.

Figure 20:
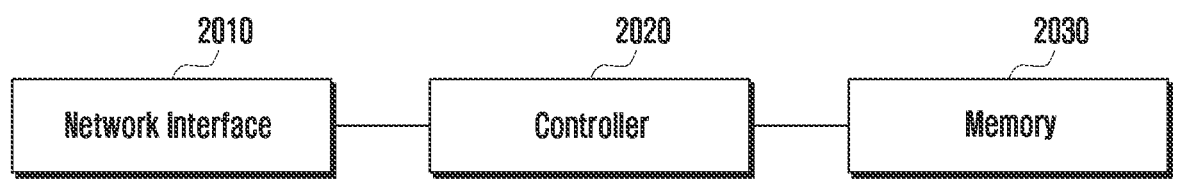
FIG. 20 is a block diagram illustrating a structure of a GMLC according to an embodiment of the disclosure.

FIG. 20 is a block diagram illustrating a structure of a GMLC according to an embodiment of the disclosure.

With reference to FIG. 20, the GMLC may communicate with other network entities of a core network through a network interface 2010. For example, the GMLC may communicate with a UE, gNB, NG-RAN, LMC, LMF, UDM, AMF, SMF, NEF, LCS client, AF, and the like.

A controller 2020 may be implemented into at least one processor and/or program for performing an operation of the GMLC. For example, the controller 2020 may perform an operation of the GMLC described above.

A memory 2030 may store programs and various control information necessary for the controller 2020, and store each information described in the disclosure. Other network entities may store information necessary for the operation described above in the same manner.

In addition to the constitution described above, the GMLC may further include various interfaces for access with the operator. In the disclosure, there is no particular limitation on such an additional constitution.

Figure 21:
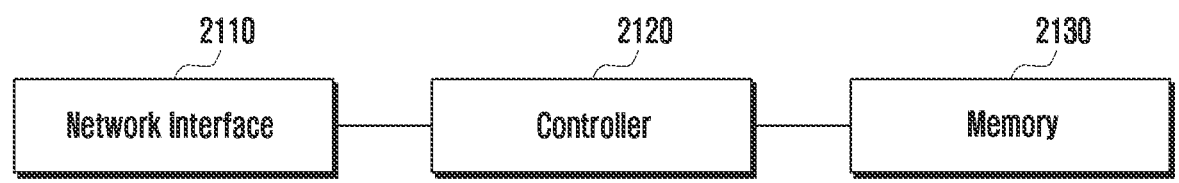
FIG. 21 is a block diagram illustrating a structure of an NEF according to an embodiment of the disclosure.

FIG. 21 is a block diagram illustrating a structure of an NEF according to an embodiment of the disclosure.

With reference to FIG. 21, the NEF may communicate with other network entities of a core network through a network interface 2110. For example, the NEF may perform communication with a UE, gNB, NG-RAN, LMC, LMF, UDM, AMF, SMF, GMLC, LCS client, AF, and the like.

A controller 2120 may be implemented into at least one processor and/or program for performing an operation of the NEF. For example, the controller 2120 may perform the operation of the NEF described above.

A memory 2130 may store programs and various control information necessary for the controller 2120, and store each information described in the disclosure. Other network entities may store information necessary for the operation described above in the same manner.

In addition to the configuration described above, the NEF may further include various interfaces for access with the operator. In the disclosure, there is no particular limitation on such an additional configuration.

Figure 22:
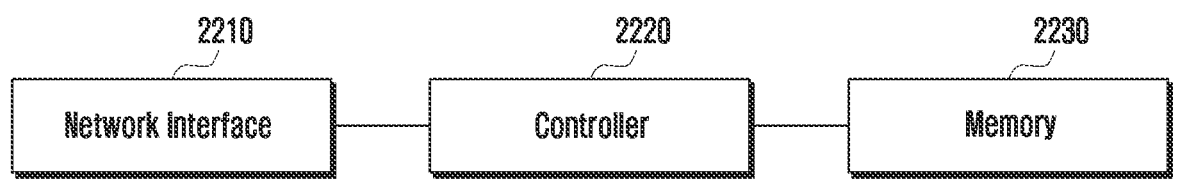
FIG. 22 is a block diagram illustrating a structure of an LCS client according to an embodiment of the disclosure.

FIG. 22 is a block diagram illustrating a structure of an LCS client according to an embodiment of the disclosure.

With reference to FIG. 22, the LCS client may communicate with other network entities of a core network through a network interface 2210. For example, the LCS client may communicate with a UE, gNB, NG-RAN, LMC, LMF, UDM, AMF, SMF, GMLC, NEF, AF, and the like.

A controller 2220 may be implemented into at least one processor or/and program for performing an operation of the LCS client. For example, the controller 2220 may perform an operation of the NEF described above.

A memory 2230 may store programs and various control information necessary for the controller 2220, and store each information described in the disclosure. Other network entities may store information necessary for the operation described above in the same manner.

In addition to the configuration described above, the LCS client may further include various interfaces for access with the operator. In the disclosure, there is no particular limitation on such an additional configuration.

Figure 23:
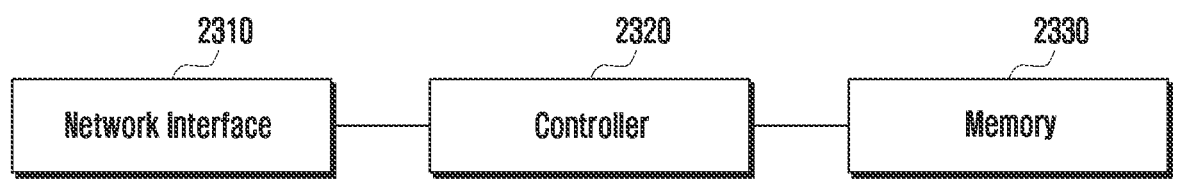
FIG. 23 is a block diagram illustrating a structure of an AF according to an embodiment of the disclosure.

FIG. 23 is a block diagram illustrating a structure of an AF according to an embodiment of the disclosure.

With reference to FIG. 23, the AF may communicate with other network entities of a core network through a network interface 2310. For example, the AF may communicate with a UE, gNB, NG-RAN, LMC, LMF, UDM, AMF, SMF, GMLC, NEF, LCS clients, and the like.

A controller 2320 may be implemented into at least one processor or/and program for performing the operation of the AF. For example, the controller 2320 may perform an operation of the AF described above.

A memory 2330 may store programs and various control information necessary for the controller 2320, and store each information described in the disclosure. Other network entities may store information necessary for the operation described above in the same manner.

In addition to the configuration described above, the AF may further include various interfaces for access with the operator. In the disclosure, there is no particular limitation on such an additional configuration.

Embodiments of the disclosure disclosed in this specification and drawings merely present specific examples in order to easily describe the technical contents of the disclosure and to help the understanding of the disclosure, and are not intended to limit the scope of the disclosure. That is, it will be apparent to those of ordinary skill in the art to which the disclosure pertains that other modifications based on the technical spirit of the disclosure can be implemented.

The invention claimed is:

1. A method performed by an access and mobility management function (AMF) in a wireless communication system, the method comprising:
receiving, from a base station, a first message requesting a location information service for a terminal, the first message including quality of service (QoS) class information and a location service quality index;
determining a connection mode of the terminal for the location information service based on the QoS class information and the location service quality index;
transmitting, to the base station, a second message including an indicator requesting activation of the connection mode and information on a time period associated with the connection mode; and
receiving, from the base station, a third message including information on whether the connection mode has been activated in the terminal,
wherein the QoS class information indicates that an assured level or a best-effort level is required for the location information service, and
wherein the location service quality index is associated with a mapping table indicating a location precision requirement and a service response time requirement.

2. The method of claim 1, wherein, during the time period, a radio resource control (RRC) connected state or a connection management (CM) connected state of the terminal is maintained for measuring location information of the terminal.

3. The method of claim 1, wherein the third message further includes a value of a radio resource control (RRC) inactivity timer that is set based on the information on the time period.

4. The method of claim 1, further comprising:
receiving, from the terminal, a fourth message requesting a non-access stratum (NAS) connection recovery;
identifying whether the connection mode has been activated in the terminal and whether the time period has expired; and
based on a determination that the connection mode has been activated in the terminal and that the time period has not expired, transmitting, to the base station, a fifth message including the indicator requesting activation of the connection mode and information indicating a remaining time period associated with the connection mode.

5. A method performed by a base station in a wireless communication system, the method comprising:
transmitting, to an access and mobility management function (AMF), a first message requesting a location information service for a terminal, the first message including quality of service (QoS) class information and a location service quality index;
receiving, from the AMF, a second message including an indicator requesting activation of a connection mode of the terminal for a for the location information service and information on a time period associated with the connection mode;
determining whether to active the connection mode for the terminal based on the indicator requesting activation of the connection mode and the information on the time period; and
transmitting, to the AMF, a third message including information on whether the connection mode has been activated in the terminal,
wherein the QoS class information indicates that an assured level or a best-effort level is required for the location information service, and
wherein the location service quality index is associated with a mapping table indicating a location precision requirement and a service response time requirement.

6. The method of claim 5, wherein, during the time period, a radio resource control (RRC) connected state or a connection management (CM) connected state of the terminal is maintained for measuring location information of the terminal.

7. The method of claim 5, wherein the third message further includes a value of a radio resource control (RRC) inactivity timer that is set based on the information on the time period.

8. An access and mobility management function (AMF) in a wireless communication system, the AMF comprising:
a transceiver; and
a controller configured to:
receive, from a base station via the transceiver, a first message requesting a location information service for a terminal, the first message including quality of service (QoS) class information and a location service quality index,
determine a connection mode of the terminal for the location information service based on the QoS class information and the location service quality index,
transmit, to the base station via the transceiver, a second message including an indicator requesting activation of the connection mode and information on a time period associated with the connection mode, and
receive, from the base station vie the transceiver, a third message including information on whether the connection mode has been activated in the terminal,
wherein the QoS class information indicates that an assured level or a best-effort level is required for the location information service, and
wherein the location service quality index is associated with a mapping table indicating a location precision requirement and a service response time requirement.

9. The AMF of claim 8, wherein, during the time period, a radio resource control (RRC) connected state or a connection management (CM) connected state of the terminal is maintained for measuring location information of the terminal.

10. The AMF of claim 8, wherein the third message further includes a value of a radio resource control (RRC) inactivity timer that is set based on the information on the time period.

11. The AMF of claim 8, wherein the controller is configured to:
receive, from the terminal via the transceiver, a fourth message requesting a non-access stratum (NAS) connection recovery, identify whether the connection mode has been activated in the terminal and whether the time period has expired, and based on a determination that the connection mode has been activated in the terminal and that the time period has not expired, transmit, to the base station via the transceiver, a fifth message including the indicator requesting activation of the connection mode and information indicating a remaining time period associated with the connection mode.

12. The AMF of claim 8, wherein the location service quality index and the mapping table are preconfigured in the AMF.

13. A base station in a wireless communication system, the base station comprising:
   a transceiver; and
   a controller configured to:
      transmit, to an access and mobility management function (AMF) via the transceiver, a first message requesting a location information service for a terminal, the first message including quality of service (QoS) class information and a location service quality index,
      receive, from the AMF via the transceiver, a second message including an indicator requesting activation of a connection mode of the terminal for the location information service and information on a time period associated with the connection mode,
      determine whether to active the connection mode for the terminal based on the indicator requesting activation of the connection mode and the information on the time period, and
      transmit, to the AMF via the transceiver, a third message including information on whether the connection mode has been activated in the terminal,
   wherein the QoS class information indicates that an assured level or a best-effort level is required for the location information service, and
   wherein the location service quality index is associated with a mapping table indicating a location precision requirement and a service response time requirement.

14. The base station of claim 13, wherein, during the time period, a radio resource control (RRC) connected state or a connection management (CM) connected state of the terminal is maintained for measuring location information of the terminal.

15. The base station of claim 13, wherein the third message further includes a value of a radio resource control (RRC) inactivity timer that is set based on the information on the time period.

* * * * *